(12) United States Patent
Watarai

(10) Patent No.: US 6,223,597 B1
(45) Date of Patent: May 1, 2001

(54) ANGULAR RATE SENSOR AND METHOD OF IMPROVING OUTPUT CHARACTERISTIC THEREOF

(75) Inventor: Takehiro Watarai, Mie-ken (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/481,707

(22) Filed: Jan. 12, 2000

Related U.S. Application Data

(62) Division of application No. 09/046,505, filed on Mar. 24, 1998, now Pat. No. 6,101,878.

(30) Foreign Application Priority Data

| Mar. 24, 1997 | (JP) | 9-70146 |
| May 4, 1997 | (JP) | 9-117212 |
| Aug. 21, 1997 | (JP) | 9-225186 |
| Feb. 18, 1998 | (JP) | 10-36319 |

(51) Int. Cl.⁷ ................................................. G01C 19/00
(52) U.S. Cl. ............................................. 73/504.16
(58) Field of Search ................................. 73/504.16

(56) References Cited

U.S. PATENT DOCUMENTS

| 4,628,642 | 12/1986 | Watson . |
| 5,212,985 | 5/1993 | Takenaka et al. . |
| 5,408,876 | 4/1995 | Macy . |
| 5,445,025 | 8/1995 | Terada et al. . |
| 5,635,642 | 6/1997 | Nonomura et al. . |
| 5,719,460 | 2/1998 | Watarai et al. . |
| 5,723,788 | 3/1998 | Terada et al. . |
| 5,763,781 | 6/1998 | Netzer . |

FOREIGN PATENT DOCUMENTS

| 6-241815 | 9/1994 | (JP) . |
| 6-289043 | 10/1994 | (JP) . |
| 8-152328 | 6/1996 | (JP) . |
| 8-210860 | 8/1996 | (JP) . |

*Primary Examiner*—Richard A. Moller
(74) *Attorney, Agent, or Firm*—Pillsbury Winthrop LLP

(57) ABSTRACT

A method of improving an output characteristic of an angular rate sensor including, for example, a fork oscillator and an improved structure of an angular rate sensor are provided. The improvement of the output characteristic is achieved by adjusting a physical structure of the oscillator to minimize unwanted vibrations of the oscillator or noises of a sensor output. The adjustment of the physical structure is achieved by trimming away an edge portion of the oscillator or a supporter for supporting the oscillator on a base.

16 Claims, 25 Drawing Sheets

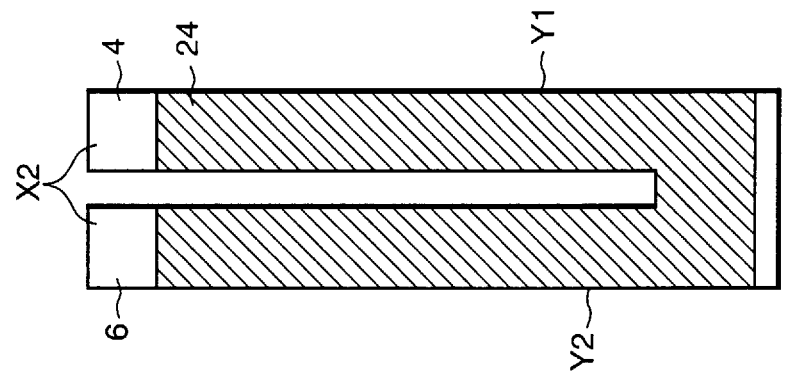
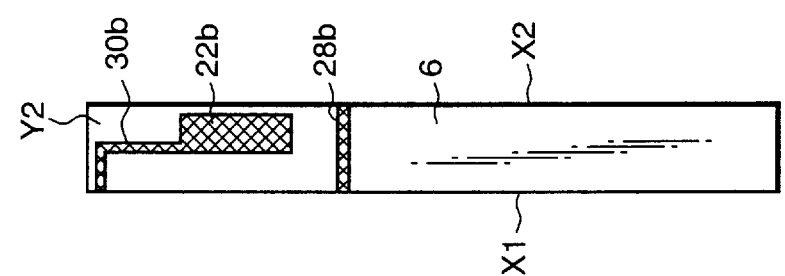
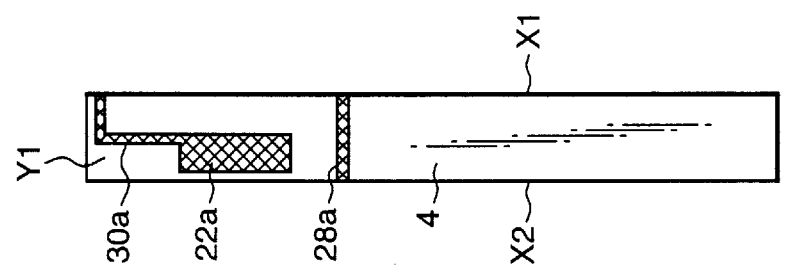
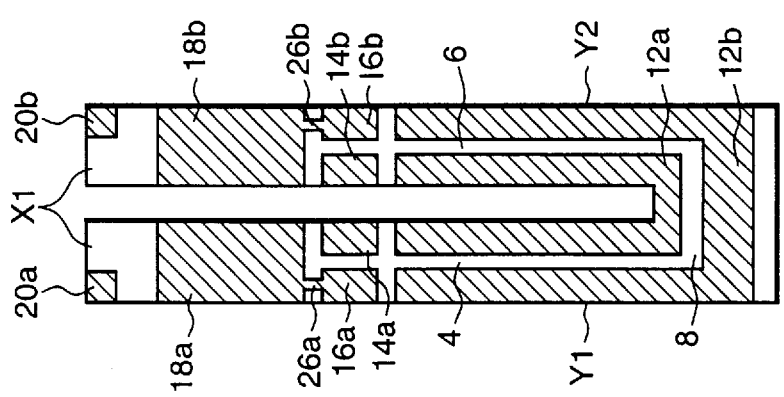

TRIMMED PORTION

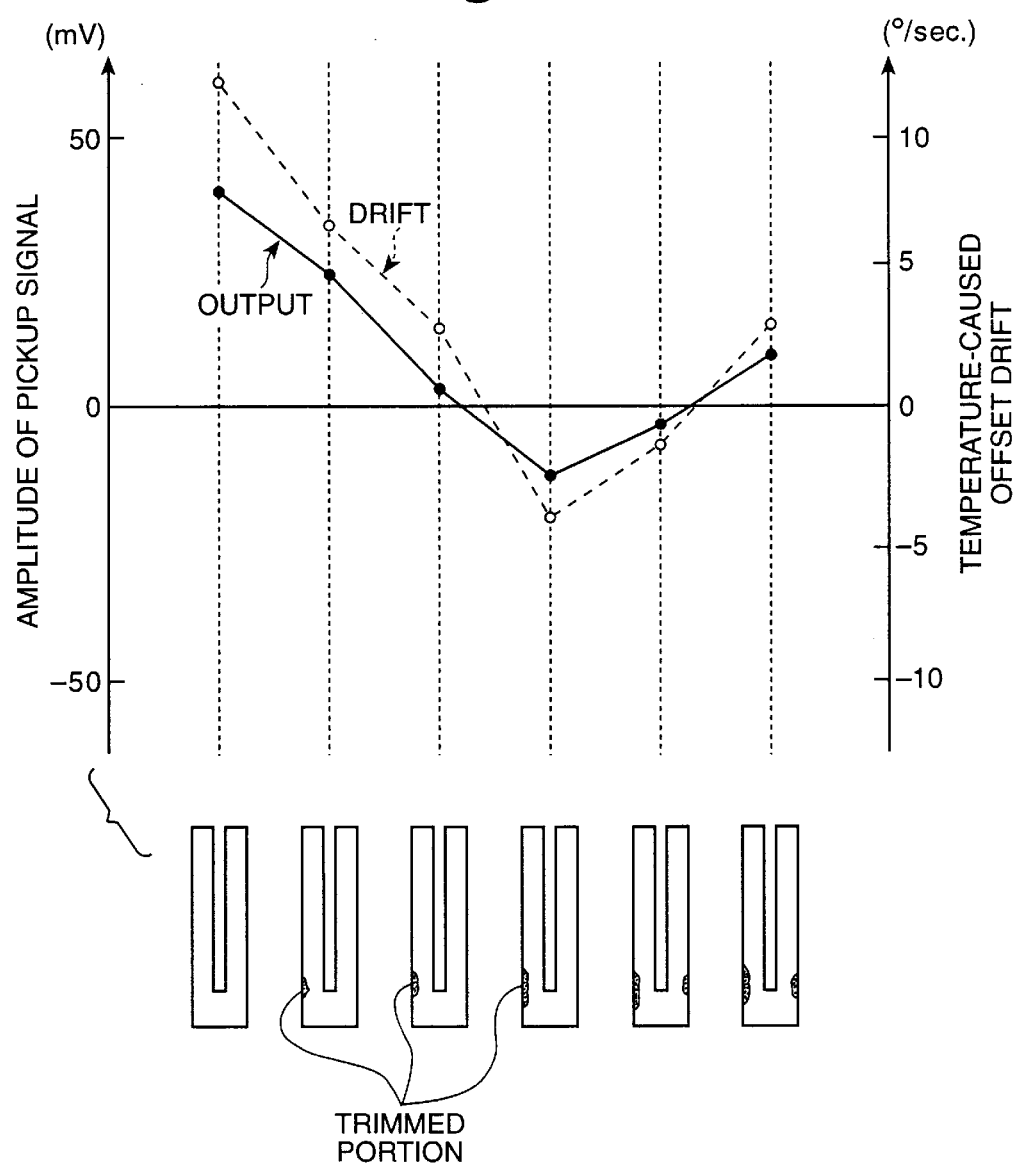

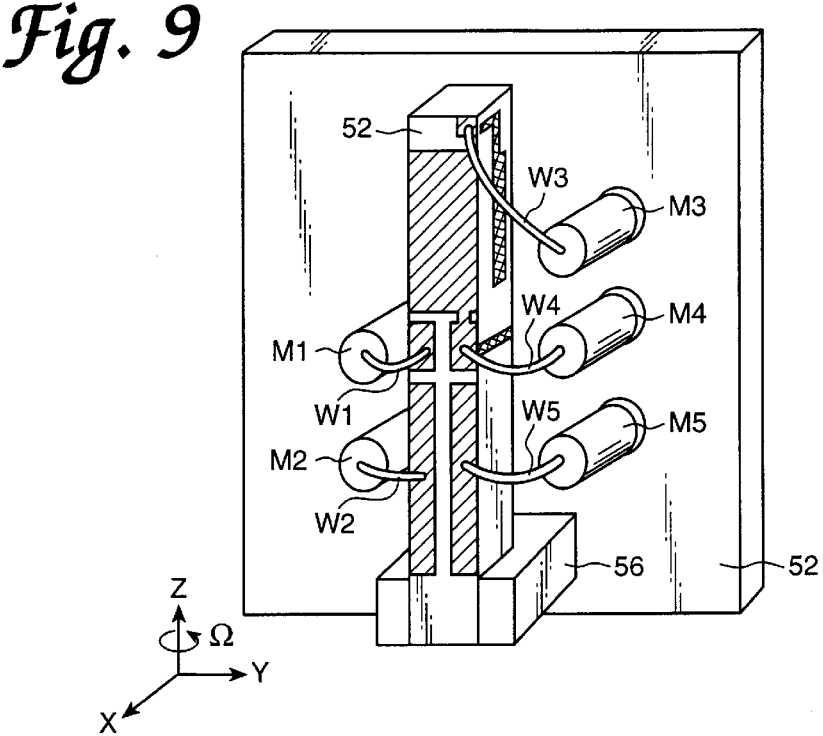
Fig. 9
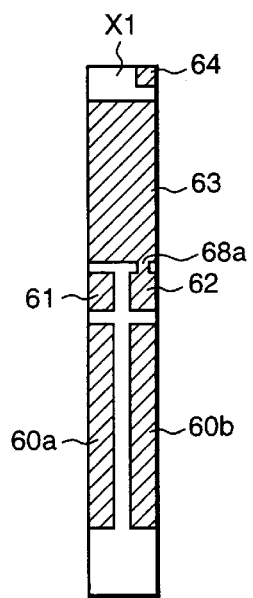  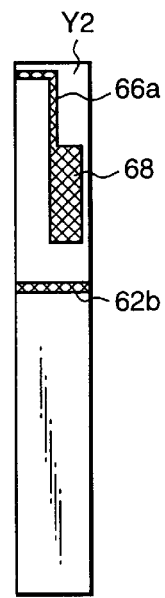 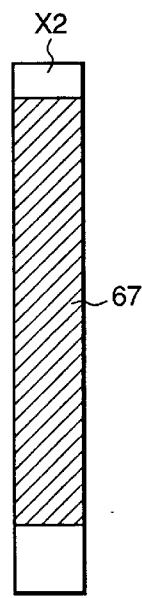
Fig. 10(a)    Fig. 10(b)    Fig. 10(c)    Fig. 10(d)

SAMPLE NO. 1

SAMPLE NO. 2

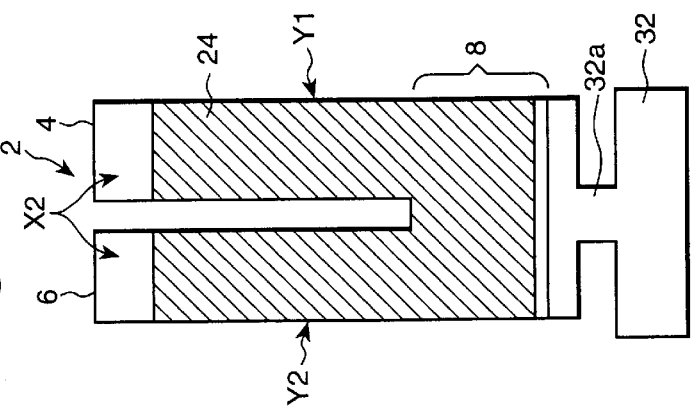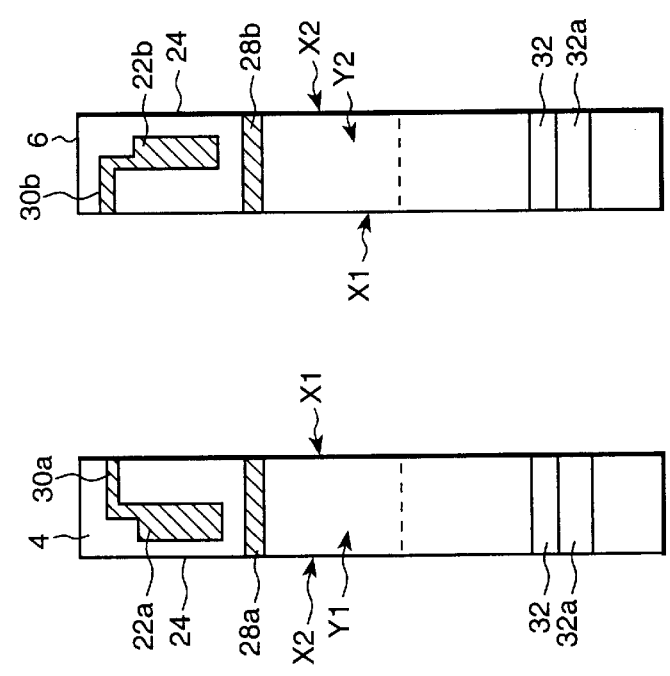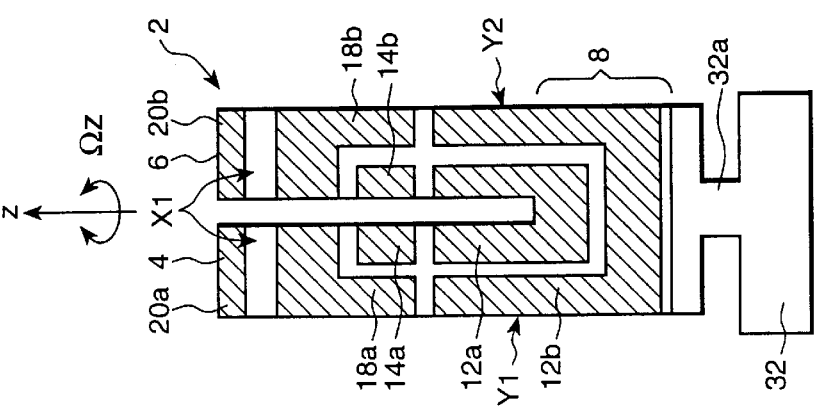

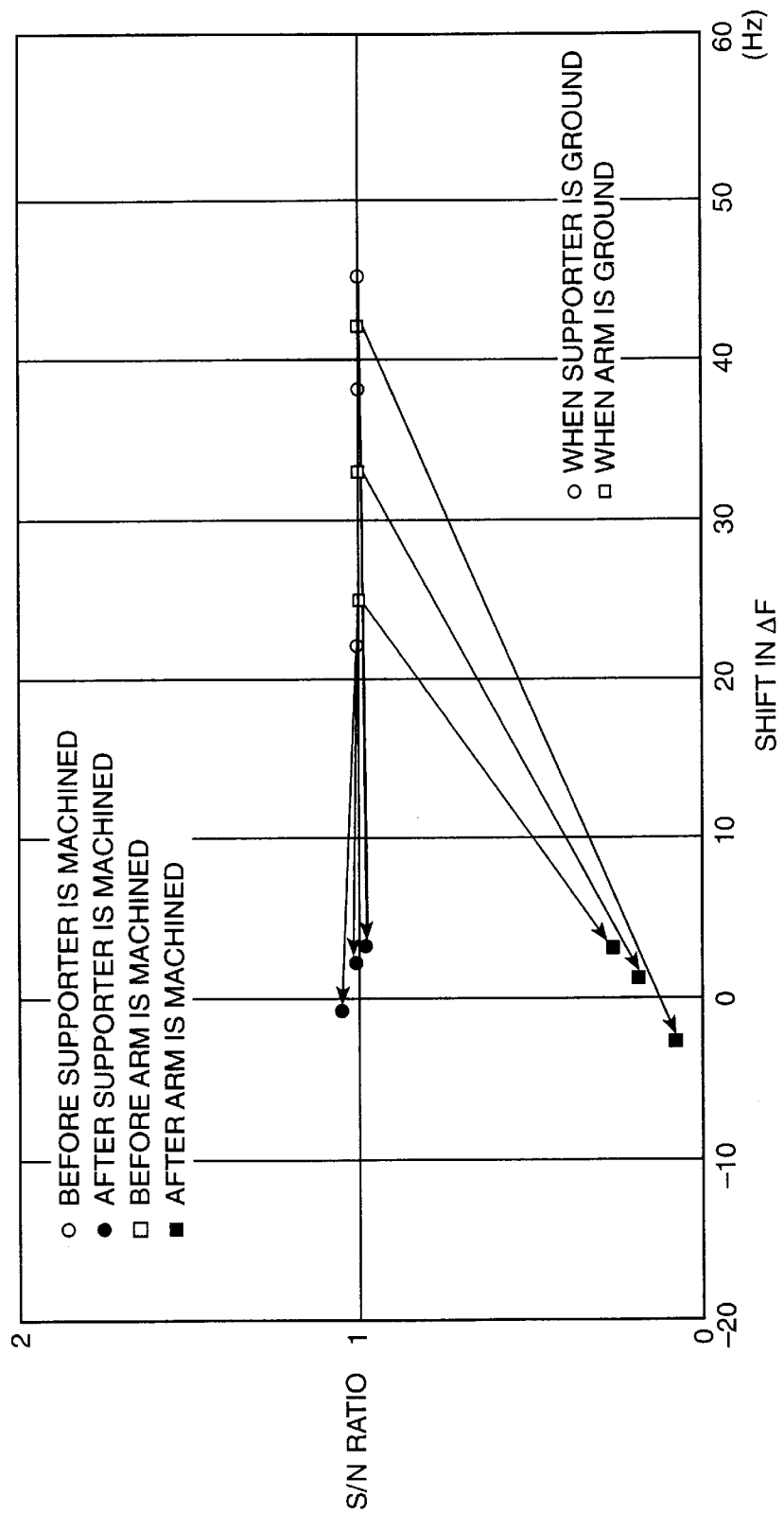

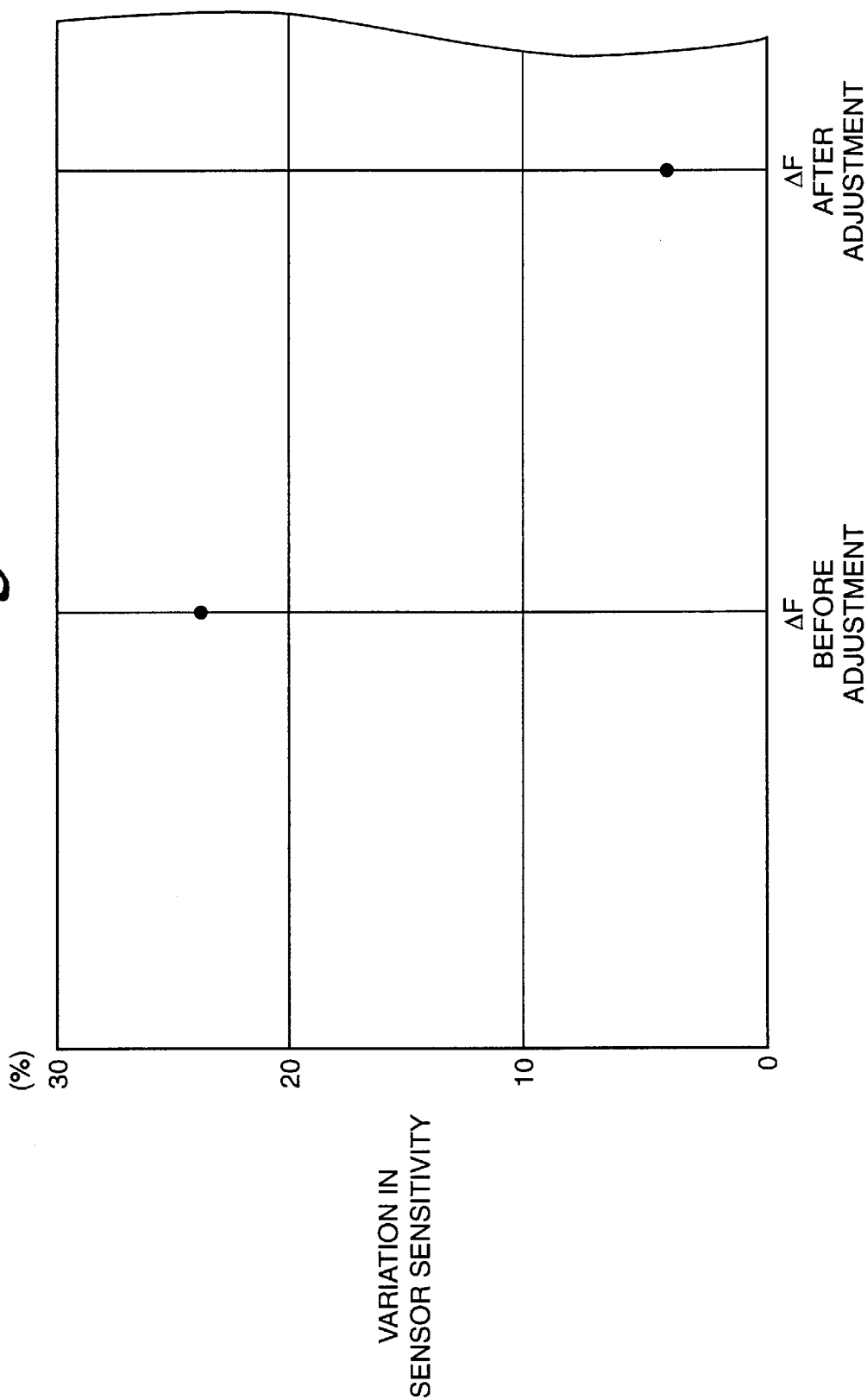

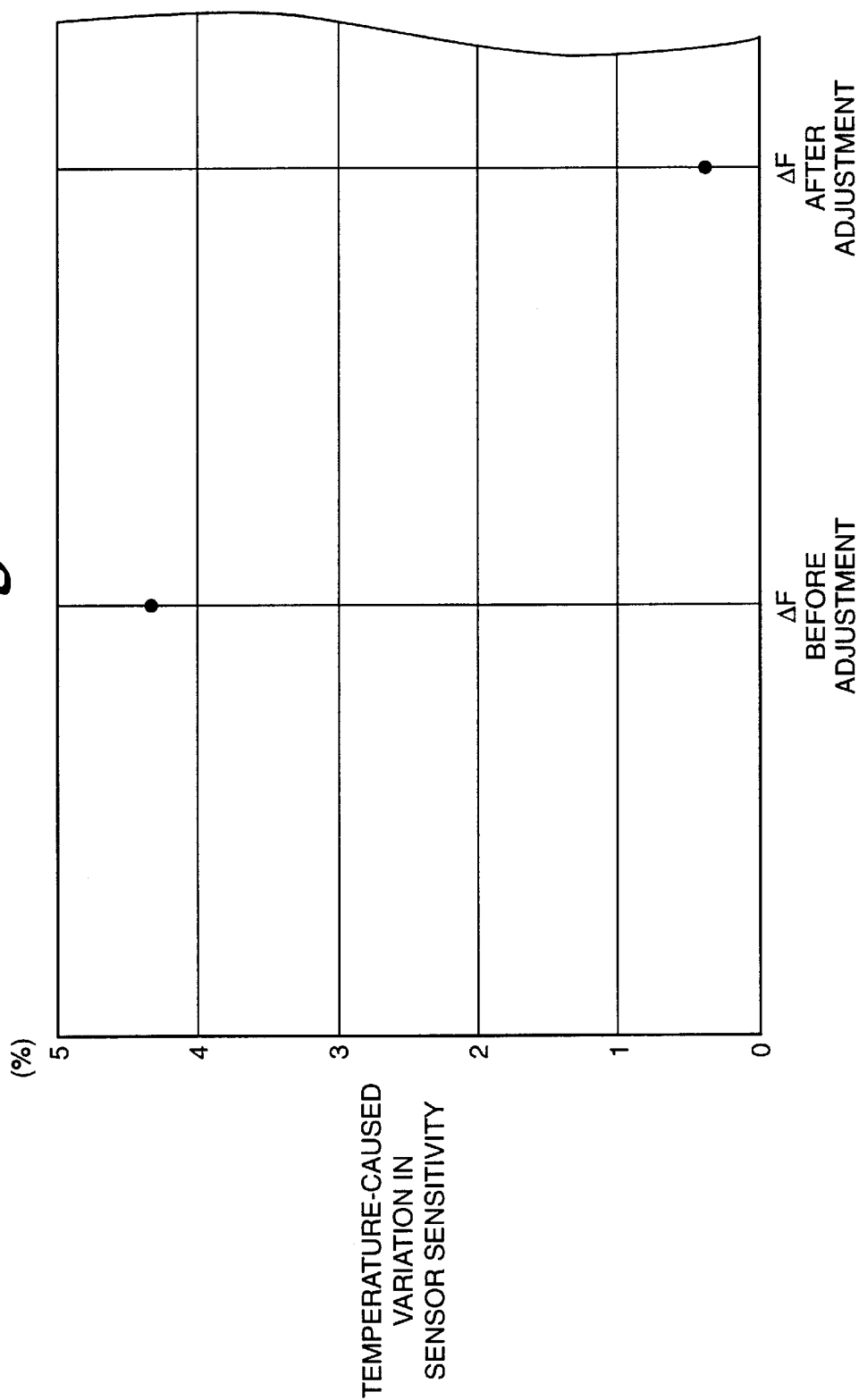

ANGULAR RATE SENSOR AND METHOD OF IMPROVING OUTPUT CHARACTERISTIC THEREOF

This is a division of application Ser. No. 09/046,505, filed Mar. 24, 1998 now U.S. Pat. No. 6,101,878.

BACKGROUND OF THE INVENTION

1. Technical Field of the Invention

The present invention relates generally to an angular rate sensor which may be employed in an attitude control system for automotive vehicles, a hand-shake compensating system for video cameras, or a gyroscope of a navigation system for moving objects and a method of improving output characteristics of an angular rate sensor.

2. Background of Related Art

Japanese Patent First Publication Nos. 8-210860, 8-152328, and 6-241815 teach conventional angular rate sensors which include an oscillator mounted on a base through a supporter. The oscillator is vibrated by the Coriolis force produced by the angular rate acting thereon during excitation, which is monitored to determine the angular rate.

Such angular rate sensors, as will be discussed later in detail, encounter several problems leading to errors of sensor outputs which will result in lack of reliability and confidence of sensor operations.

SUMMARY OF THE INVENTION

It is therefore a principal object of the present invention to avoid the disadvantages of the prior art.

It is another object of the present invention to provide an angular rate sensor designed to measure an angular rate acting on a moving object with high accuracy.

It is a further object of the invention to provide a method of adjusting a physical structure of an angular rate sensor to improve an output characteristic thereof.

According to one aspect of the present invention, there is provided a method of adjusting an oscillation characteristic of an oscillator of an angular rate sensor, the oscillator having a given length and being shaped to have a plurality of longitudinal edges, the oscillator being excited by input of an excitation signal to oscillate in a first direction perpendicular to the length of the oscillator and, when the angular rate sensor undergoes an angular rate during excitation of the oscillator, oscillating in a second direction perpendicular to the length of the oscillator to provide an output indicative of the angular rate, which comprises the steps of: (a) applying to the oscillator an ac voltage having a resonant frequency, at which the oscillator resonates in the first direction, to oscillate the oscillator; (b) monitoring an output signal of the oscillator during oscillation of the oscillator by application of the ac voltage; and (c) adjusting the oscillation characteristic of the oscillator so as to decrease an amplitude of the monitored output signal of the oscillator to minimize undesired oscillations of the oscillator in the second direction when excited by the input of the excitation signal.

In the preferred mode of the invention, the adjusting step removes a portion of the oscillator to adjust the oscillation characteristic of the oscillator. The removed portion of the oscillator may be one of the longitudinal edges of the oscillator.

The oscillator is a fork oscillator including a pair of arms and a connecting portion connecting ends of the arms. The adjusting step removes a portion of at least one of longitudinal edges of the arms to adjust the oscillation characteristic of the oscillator.

The adjusting step may remove at least one of an longitudinal edge portion of one of the arms leading to the connecting portion, an edge portion of the connecting portion extending in a lengthwise direction of the arms, and a portion of the longitudinal edges of the oscillator extending over a connection between one of the arms and the connecting portion.

The oscillator may alternatively include a single oscillating portion made of a polygonal rod member whose end is fixed on the angular rate sensor. The adjusting step may remove a portion of the oscillating portion leading to the fixed end or alternatively remove a central portion of a longitudinal edge of the oscillating portion to adjust the oscillation characteristic of the oscillator.

The adjusting step may machine a portion of the oscillator in a lengthwise direction or alternatively in a depthwise direction to adjust the oscillation characteristic of the oscillator.

The oscillator is made of a piezoelectric element.

According to the second aspect of the invention, there is provided a method of adjusting an output characteristic of an angular rate sensor which includes a first oscillator having a given length, shaped to have a plurality of longitudinal edges, excitation means responsive to input of an excitation signal for exciting the first oscillator to oscillate in an excitation-axis direction perpendicular to a longitudinal center line of the first oscillator, and a second oscillator having a given length, shaped to have a plurality of longitudinal edges having pickup means for picking up oscillations of the second oscillator in a pickup-axis direction perpendicular to a longitudinal center line of the second oscillator, which comprises the steps of: (a) applying an ac voltage having a resonant frequency, at which the first oscillator resonates in the excitation-axis direction, to the excitation means to oscillate the oscillating portion of the first oscillator; (b) monitoring an output of the pickup means during oscillation of the first oscillator by application of the ac voltage; and (c) adjusting oscillation characteristics of the first and second oscillators so as to decrease an amplitude of the monitored output of the pickup means to minimize undesired oscillations of the second oscillator in the pickup-axis direction produced during oscillation of the first oscillator by the excitation means.

In the preferred mode of the invention, the adjusting step removes portions of the first and second oscillators to adjust the oscillation characteristics of the first and second oscillators. Each of the removed portions of the first and second oscillators may be one of the longitudinal edges of corresponding one of the first and second oscillators.

Each of the first and second oscillator may be a fork oscillator including a pair of arms and a connecting portion connecting ends of the arms. In this case, the adjusting step removes a portion of at one of longitudinal edges of the arms of each of the first and second oscillators to adjust the oscillation characteristic of the oscillator.

The adjusting step may remove at least one of an longitudinal edge portion of one of the arms leading to the connecting portion of each of the first and second oscillators, an edge portion of the connecting portion extending in a lengthwise direction of the arms of each of the first and second oscillators, and a portion of the longitudinal edges extending over a connection between one of the arms and the connecting portion of each of the first and second oscillators.

According to the third aspect of the invention, there is provided an angular rate sensor for determining an angular rate of rotation when the angular rate sensor experiences the rotation about a given axis, which comprises: (a) an oscillator made of a piezoelectric element including at least one pair of arms and a connecting portion connecting ends of the arms; (()) a drive electrode formed on an outer wall of the oscillator, the drive electrode being responsive to input of an excitation signal to oscillate the arms of the oscillator in a first direction perpendicular to length of the oscillator; (c) a pickup electrode formed on the outer wall of the oscillator, the pickup electrode electrically picking up oscillations of the arms in a second direction different form the first direction which indicate the angular rate acting on the angular rate sensor; and (d) an uneven portion formed on a portion of the oscillator near a connection of the connecting portion and the arms for adjusting an oscillation characteristic of the oscillator.

In the preferred mode of the invention, the uneven portion occupies a length of at least one of the arms which extends from the connection and which corresponds to 170% or less of a dimension of the connecting portion in a lengthwise direction of the one of the arms, a portion of the connecting portion ranging from the connection to 70% or less of a dimension of the connecting portion in the lengthwise direction of the arms, or alternatively the both.

According to the fourth aspect of the invention, there is provided a method of adjusting an oscillation characteristic of an oscillator of an angular rate sensor, the oscillator being made of a piezoelectric element shaped to have a plurality of longitudinal edges, including at least one pair of arms and a connecting portion connecting ends of the arms, the oscillator having disposed thereon an excitation electrode and a pickup electrode, the arms being excited by input of an excitation signal through the excitation electrode to oscillate in a first direction perpendicular to length of the arms and, when the angular rate sensor undergoes an angular rate during excitation of the arms, oscillating in a second direction different from the first direction to provide an output signal indicative of the angular rate through the pickup electrode, comprising the steps of: (a) applying an ac voltage to the excitation electrode to oscillate the arms in the first direction; (b) monitoring an output signal of the oscillator through the pickup electrode during oscillation of the arms by application of the ac voltage; and (c) forming an uneven portion on a portion of the oscillator near a connection of the connecting portion and the arms so as to decrease an amplitude of the monitored output signal of the oscillator to minimize undesired oscillations of the oscillator in the second direction when excited by the input of the excitation signal.

In the preferred mode of the invention, the uneven portion occupies a length of at least one of the arms which extends from the connection and which corresponds to 170% or less of a dimension of the connecting portion in a lengthwise direction of the one of the arms, a portion of the connecting portion ranging from the connection to 70% or less of a dimension of the connecting portion in the lengthwise direction of the arms, or alternatively the both.

The uneven portion forming step removes material from the oscillator to form the uneven portion.

The uneven portion forming step may machine the oscillator in the lengthwise direction of the arms to form the uneven portion or alternatively in a depthwise direction of the oscillator to form the uneven portion.

According to the fifth aspect of the invention, there is provided an angular rate sensor for determining an angular rate of rotation when the angular rate sensor experiences the rotation about a given axis, which comprises: (a) an oscillator made of a piezoelectric element including at least one pair of arms and a connecting portion connecting ends of the arms, the arms being excited by input of an excitation signal to oscillate at a first frequency in a first direction perpendicular to length of the arms and, when the angular rate sensor undergoes an angular rate during of the arms, oscillating at a second frequency in a second direction different from the first direction to provide a signal indicative of the angular rate; and (b) a supporting member mounted on a base to hold a node portion of the oscillator, the supporting member having a narrower portion which is so shaped that a frequency difference between the first and second frequencies lies within a preselected range.

In the preferred mode of the invention, the narrower portion of the supporting member is made of a sintered metal.

The supporting member is of an H-shape and also includes first and second members which extend substantially in parallel and which are connected through the narrower portion. The first member is attached to the connecting portion of the oscillator. The second member is attached to the base.

The narrower portion has a length oriented substantially in alignment with a longitudinal center line of the oscillator extending between the arms.

According to the sixth aspect of the invention, there is provided a manufacturing method of an angular rate sensor comprising the steps of: (a) a preparing an oscillator made of a piezoelectric element, including at least one pair of arms and a connecting portion connecting ends of the arms, the arms being excited by input of an excitation signal to oscillate at a first frequency in a first direction perpendicular to length of the arms and, when the angular rate sensor undergoes an angular rate during excitation of the arms, oscillating at a second frequency in a second different from the first direction to provide an output signal indicative of the angular rate: (b) installing the oscillator on a base through a supporting member, the supporting member having a narrower portion; (c) applying an ac voltage to the oscillator to oscillate the arms in the first direction; (d) monitoring an output signal from the oscillator during oscillation of the arms by application of the ac voltage to determine a frequency difference between the first and second frequencies; and (e) changing torsional rigidity of the narrower portion of the supporting member so that the frequency difference determined in the monitoring step lies within a preselected range.

In the preferred mode of the invention, the torsional rigidity changing step modifies shape of the narrower portion of the supporting member to change the torsional rigidity. For example, the torsional rigidity changing step removes material from the narrower portion or attaches a given member to the narrower portion to change the torsional rigidity.

According to the seventh aspect of the invention, there is provided a method of adjusting an oscillation characteristic of an oscillator of an angular rate sensor, the oscillator being made of a piezoelectric element, including at least one pair of arms and a connecting portion connecting ends of the arms, the arms being excited by input of an excitation signal to oscillate at a first frequency in a first direction perpendicular to length of the arms and, when the angular rate sensor undergoes an angular rate during excitation of the oscillator, oscillating at a second frequency in a second direction different from the first direction to produce an output signal indicative of the angular rate, which comprises the steps of: (a) applying an ac voltage to the oscillator to oscillate the arms in the first direction; (b) monitoring an output signal from the oscillator during oscillation of the arms by application of the ac voltage to determine a frequency difference between the first and second frequencies; and (c) changing torsional rigidity of the narrower portion of the supporting member so that the frequency difference determined in the monitoring step lies within a preselected range.

In the preferred mode of the invention, the torsional rigidity changing step modifies shape of the narrower portion of the supporting member to change the torsional rigidity.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but for explanation and understanding only.

In the drawings:

FIG. 2(a) is a front view which shows electrodes formed on a front surface of an oscillar;

FIGS. 2(b) and 2(c) are side views which show electrodes formed on side surfaces of an oscillator;

FIG. 2(d) is a back view which shows an electrode formed on a back surface of an oscillator;

FIG. 7 is a graph which shows variations in amplitude of a pickup signal and a temperature-caused offset drift caused by trimming an oscillator;

FIG. 9 is a perspective view which shows an angular rate sensor according to the second embodiment of the invention;

FIGS. 10(a) to 10(d) show electrodes formed on surfaces of an oscillator in FIG. 9;

FIGS. 23(a) to 23(d) show electrodes formed on surfaces of the oscillator in FIG. 22;

FIG. 25 is a graph which shows relations between a frequency difference ΔF and a ratio S/N of a sensor sensitivity S to an offset noise N when a connecting portion of an supporter is ground and when arms of an oscillator are ground;

FIG. 26 is a graph which illustrates variations in sensor sensitivity S measured at room temperature before and after a frequency difference ΔF is corrected; and FIG. 27 is a graph which illustrates variations in ratio of a maximum value to a minimum value of a sensor sensitivity S when the ambient temperature is changed from −30° C. to 85° C. before and after a frequency difference ΔF is corrected.

DESCRIPTION OF THE PREFERRED EMBODIMENT

Figure 1:
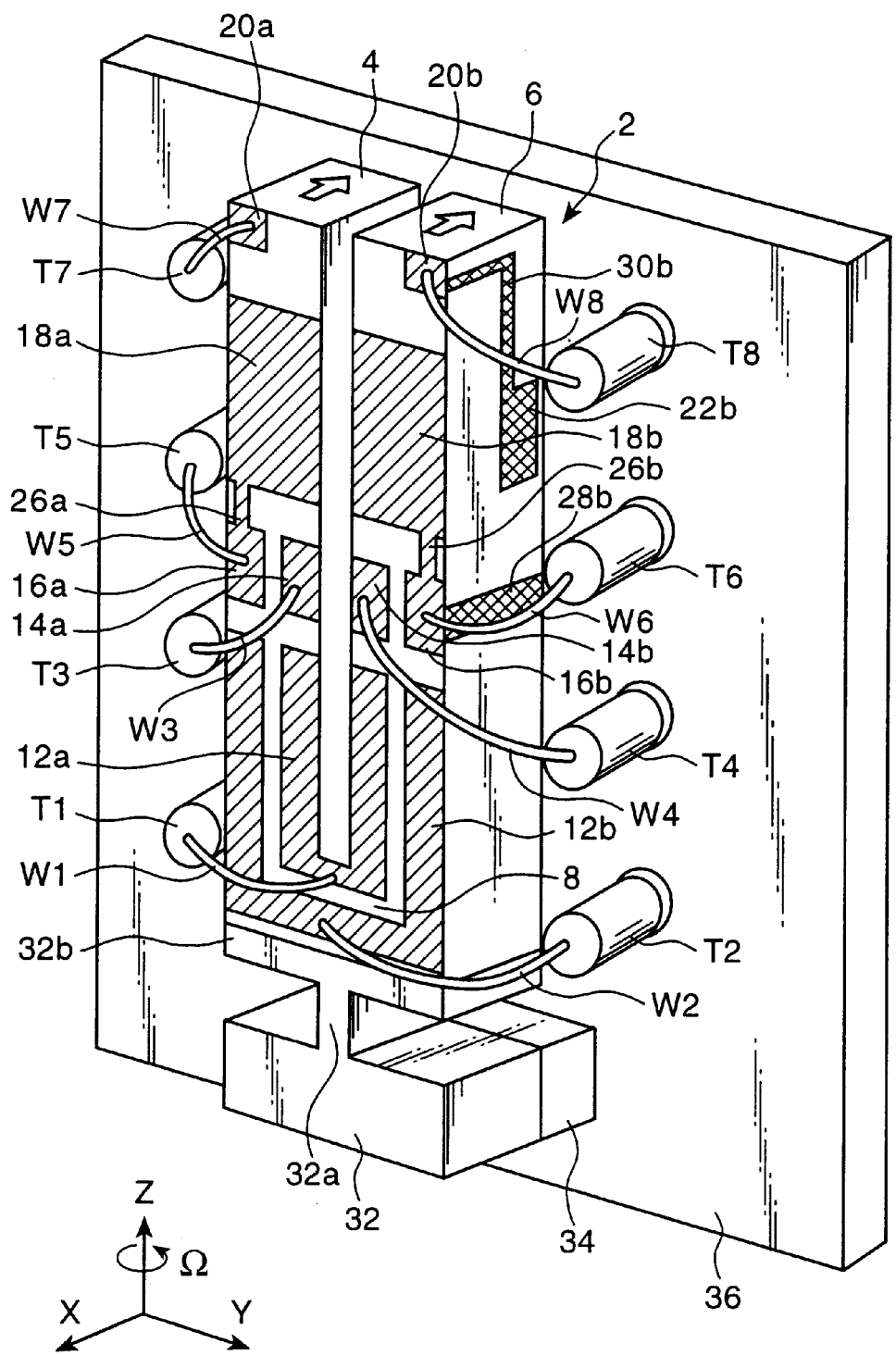
FIG. 1 is a perspective view which shows an angular rate sensor according to the first embodiment of the invention.

Referring now to the drawings, wherein like reference numbers refer to like parts throughout several views, particularly to FIG. 1, there is shown an angular rate sensor according to the first embodiment of the invention which may be employed as a yaw rate sensor designed to measure the yaw rate of a moving object such as an automotive vehicle or a handy video camera.

The angular rate sensor includes an oscillator 2, a base 36, and a supporter 32 for supporting the oscillator 2 on the base 36.

The oscillator 2 is, as clearly shown formed as a prism in the drawing, a typical fork oscillator and consists of a pair of tines or arms 4 and 6 each being made of a square member and a stem 8. The oscillator 2 may be formed with a single piece of piezoelectric (PZT) material such as a piezoelectric ceramic or a piezoelectric crystal, but this embodiment uses a piezoelectric ceramic for facilitating polarization of the oscillator 2.

The oscillator 2, as shown in FIG. 2(a), has formed on a front surface thereof, which will be referred to as a surface X1 below, a pair of U-shaped drive electrodes 12a and 12b, a pair of monitor electrodes 14a and 14b, a pair of virtual GND electrodes 16a and 16b, a pair of polarizing electrodes 18a and 18b, and a pair of square pad electrodes 20a and 20b.

The drive electrodes 12a and 12b extend over lower portions of the arms 4 and 6 through the stem 8 at a given interval away from each other. The monitor electrodes 14a and 14b are disposed on central portions of the arms 4 and 6, respectively. The virtual GND electrodes 16a and 16b are disposed outside the monitor electrodes 14a and 14b. The polarizing electrodes 18a and 18b are disposed on upper portions of the arms 4 and 6 in connection with the virtual GND electrodes 16a and 16b through short-circuit electrodes 26a and 26b, respectively. The pad electrodes 20a and 20b are disposed on upper outside corners of the arms 4 and 6, respectively.

The oscillator 2 also has pickup electrodes 22a and 22b, short-circuit electrodes 28a and 28b, as shown in FIGS. 2(b) and 2(c), formed on side surfaces, as will be referred to as surfaces Y1 and Y2 below, and a common virtual GND electrode 24, as shown in FIG. 2(d), formed on a back surface, as will be referred to as a surface X2 below. The common virtual GND electrode 24 is connected to the virtual GND electrodes 16a and 16b through the short-circuit electrodes 28a and 28b, respectively, and serves as a ground electrode common to the drive electrodes 12a and 12b, the monitor electrodes 14a and 14b, and the polarizing of electrodes 18a and 18b when the oscillator 2 is polarized. The pickup electrodes 22a and 22b are disposed on portions of the surfaces Y1 and Y2 near the surface X2 and opposed to each other across the polarizing electrodes 18a and 18b. The pickup electrodes 22a and 22b are connected to the pad electrodes 20a and 20b through L-shaped lead electrodes 30a and 30b, respectively.

The oscillator 2 is polarized in a direction (i.e., the x-axis direction) from the surface X1 to the surface X2, as indicated by arrows in FIG. 1, prior to installation on the base 36. This polarization is achieved before forming the pickup electrodes 22a and 22b, the lead electrodes 30a and 30b, and the short-circuit electrodes 28a and 28b by applying a given voltage across the virtual GND electrode 24 and the drive electrodes 12a and 12b, the monitor electrodes 14a and 14b, the virtual GND electrodes 16a and 16b, and the polarizing electrodes 18a and 18b. After completion of the polarization, the pickup electrodes 22a and 22b, the lead electrodes 30a and 30b, and the short-circuit electrodes 28a and 28b are formed on the surfaces Y1 and Y2 to connect the common virtual GND electrode 24 with the virtual GND 16a and 16b and to connect the pickup electrodes 22a and 22b with the pad electrodes 20a and 20b.

The thus polarized oscillator 2 is glued at the bottom of the stem 8 to the supporter 32 using an epoxy adhesive, for example.

The supporter 32 is made of metal such as 42N and has substantially H-shape consisting of a connecting portion 32a, a mount portion 32b, and a base portion 32c. The mount portion 32b is bonded to the oscillator 2. The base portion 32c is bonded or welded to the upper surface of the base 36 through a spacer 34 so that the back surface (i.e., the surface X2) of the oscillator 2 may extend parallel to the upper surface of the base 36. The angular rate sensor is mounted on a moving object so that an axis of rotation (i.e., the z axis in FIG. 1) of a moving object such as an automotive vehicle, whose angular rate is to be measured by the angular rate sensor, may lie in coincidence with the longitudinal center line of the oscillator 2 extending between the opposed side surfaces of the arms 4 and 6. The connecting portion 32a connects the mount portion 32b and the base portion 32c and serves to absorb vibrations transmitted from the base 36 to the oscillator 2.

The base 36 is installed on the moving object directly or using a rubber member and has eight terminals T1 to T8 connecting with the drive electrodes 12a and 12b, the monitor electrodes 14a and 14b, the virtual GND electrodes 16a and 16b, and the pad electrodes 20a and 20b through metallic wires W1 to W8, respectively. The connection of each electrode and one of the wires is accomplished with wire bonding. The terminals T1 to T8 are connected to a detection circuit (not shown). The glass material is loaded into a clearance between the periphery of each of the terminals T1 to T8 and a mount hole formed in the base 36 for electrical isolation and hermetic sealing.

When the angular rate is measured, the virtual GND electrode 16a and 16b, the polarizing electrodes 18a and 18b, and the common virtual GND electrode 24 are kept at a reference potential through the terminals T5 and T6. The terminals T5 and T6 may be tied directly to ground or biased to be kept at a constant voltage of 2.5V, for example. Ac excitation signals which are 180° out of phase with each other are applied to the drive electrodes 12a and 12b. The ac excitation signals have the frequency that is the resonant frequency of the oscillator 2 at which the arms 4 and 6 resonate in the y-axis direction in FIG. 1.

Upon application of the ac excitation signals, the arms 4 and 6 oscillate in opposite directions along the y axis (also referred to as the excitation axis below). During the oscillation, output signals of the monitor electrodes 14a and 14b are monitored through the terminals T3 and T4 to control the ac excitation signals for maintaining the amplitude of the oscillation of the arms 4 and 6 in the excitation-axis direction constant regardless the variation in ambient temperature (self-excited oscillation control).

When the angular rate sensor is moved at the angular rate Ω around the z axis (i.e., the longitudinal center line of the oscillator 2 extending between the arms 4 and 6) during the self-excited oscillation control, it will cause the Coriolis force to be produced which vibrates the arms 4 and 6 in opposite directions along the x axis (also referred to as the pickup axis below). This vibration produces current flows between the pickup electrodes 22a and 22b and the virtual GND electrode 24 which are proportional to the angular rate Ω. The current flows are inputted to a current-voltage converter (not shown) through the terminals T7 and T8 and converted into voltage signals. The voltage signals are converted into a sensor signal which corresponds to a difference between the voltage signals and indicates the angular rate Ω acting on the angular sensor around the z axis.

In the above angular rate sensor, the frequency at which the oscillator 2 resonates in the excitation-axis direction (i.e., the frequency of the ac excitation signals applied to the oscillator 2, which will be referred to as the excited oscillation frequency fd below) is close to the frequency at which the angular rate Ω acting on the angular rate sensor causes the oscillator 2 to resonate in the pickup-axis direction (referred to as the pickup oscillation frequency fs below). The oscillation of the oscillator 2 at the excited oscillation frequency fd produced by application of the ac excitation signals, thus, causes oscillation to occur undesirably at the pickup oscillation frequency fs even when no angular rate acts on the angular rate sensor, so that outputs of the pickup electrodes 22a and 22b will contain error components which will be referred to as offset signals.

In analysis of the offset signal, the inventor of this application found that the offset signal is changed by, in addition to the undesired oscillation of the oscillator 2 in the pickup-axis direction occurring during the oscillation at the excited oscillation frequency fd in the excitation-axis direction, electric noises appearing in the oscillator 2 caused by the applied excitation signals and harmonic components of the oscillations of the oscillator 2 in the excitation-axis and pickup-axis directions. Especially, the undesired oscillation of the oscillator 2 in the pickup-axis direction was found to be changed by the ambient temperature, thereby resulting in a change in the offset signal (this will be referred to below as a temperature-caused offset drift).

In order to avoid such a drawback, the angular rate sensor of this embodiment is adjusted physically in a manner, as discussed below, to minimize the undesired oscillation of the oscillator 2 in the pickup-axis direction.

Figure 3:
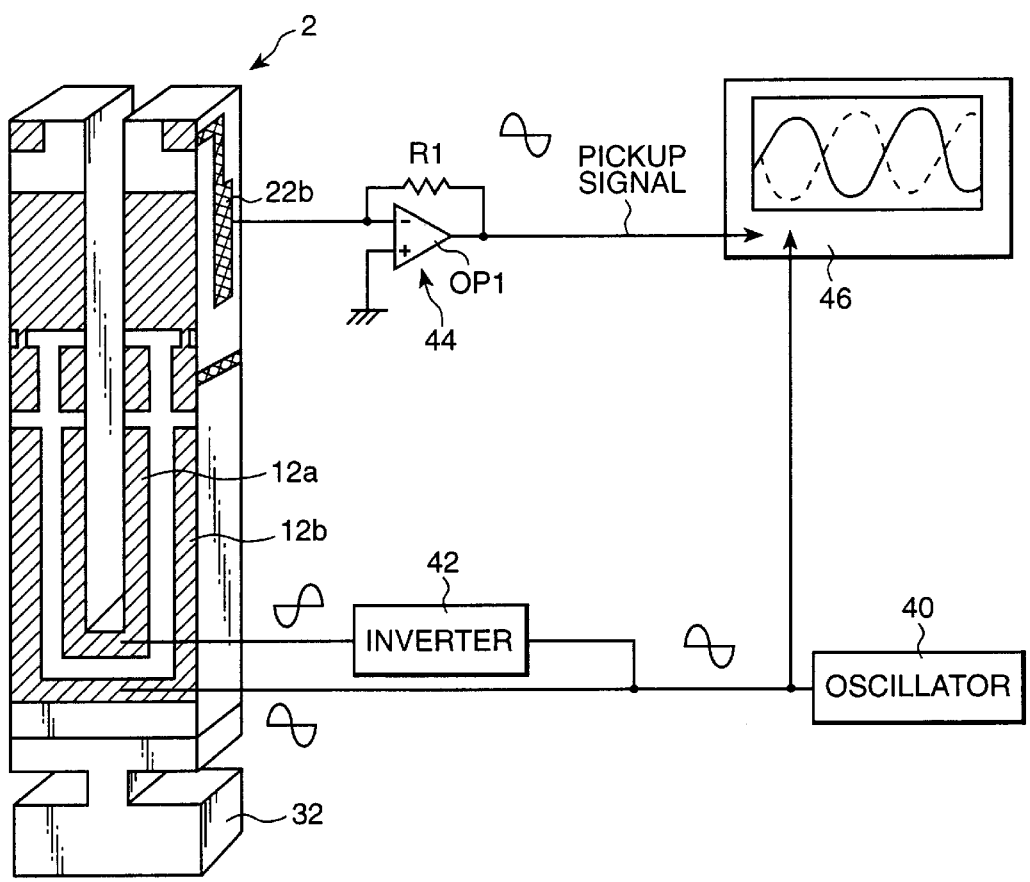
FIG. 3 is a circuit diagram which shows an oscillation output monitoring circuit used to minimize undesired oscillation of an oscillator which will lead to errors of outputs of an angular rate sensor.

In this adjustment, the common virtual GND electrode 24 is first kept at a reference potential, and ac excitation signals which are 180° out of phase with each other and each of which changes the polarity across the reference potential are applied to the drive electrodes 12a and 12b. In practice, two ac excitation signals are, as shown in FIG. 3, provided to the drive electrodes 12a and 12b using an oscillator 40, one of which is inputted directly to the drive electrode 12b and the other of which is inputted to the drive electrode 12a after being reversed in phase through the phase inverter 42. The ac excitation signals have the resonant frequency at which the arms 4 and 6 resonate in the x-axis direction (i.e., the pickup oscillation frequency fs), not the excited oscillation frequency fd. The current flowing between the pickup electrode 22b and the common virtual GND electrode 24 is picked up by a current-voltage converter 44. The current-voltage converter 44 converts the input current into a voltage signal and provides it to the oscilloscope 46 as a pickup signal. The current-voltage converter 44 has a known structure consisting of an operational amplifier OP1 and a resistor R1.

Figure 4A:
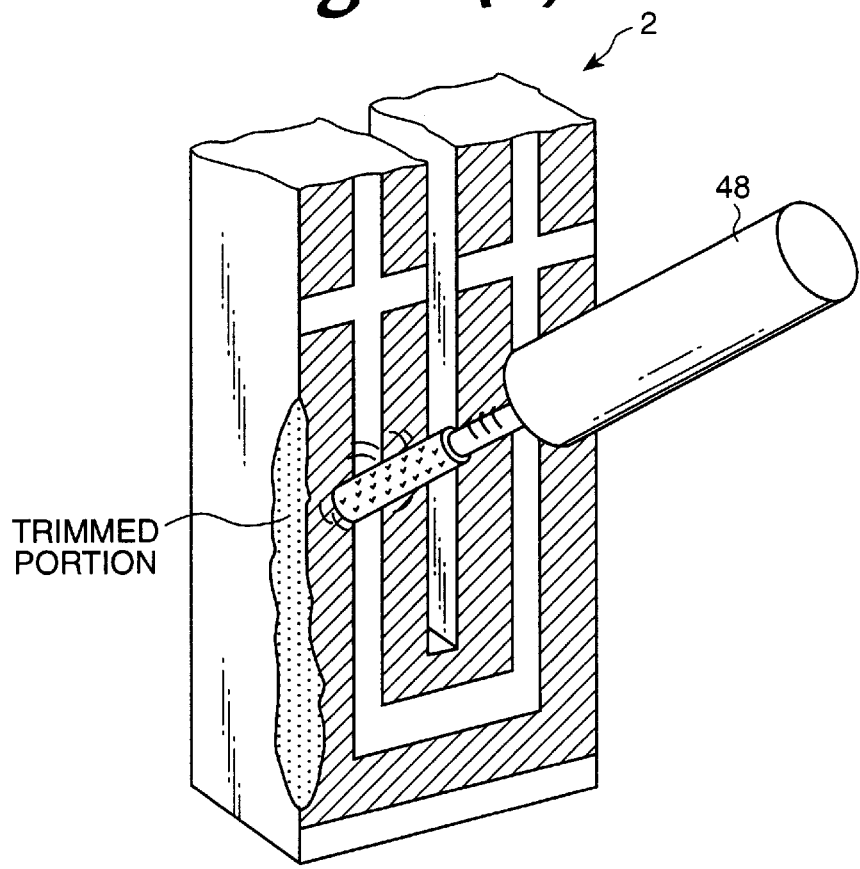
FIG. 4(a) is a perspective view which shows an oscillator trimmed correct an output characteristic of an angular rate sensor using an output oscillation output monitoring circuit shown in FIG. 3.

The oscilloscope 46 monitors the pickup signal and the excitation signal outputted from the current-voltage converter 44 and the oscillator 40 and displays waveforms thereof. When the level (i.e., the amplitude) of the pickup signal displayed on the oscilloscope 46 is greater than zero (0) or a preselected threshold value, a portion of the oscillator 2 to be trimmed away is determined based on the phase relation between the ac excitation signal and the pickup signal. Next, the determined portion of the oscillator 2 is, as shown in FIG. 4(a), trimmed away with a router 48. As set forth above, the oscillator is formed from a prism member. The ridges of the prism member are trimmed in accordance with the preferred embodiments.

Figure 5A:
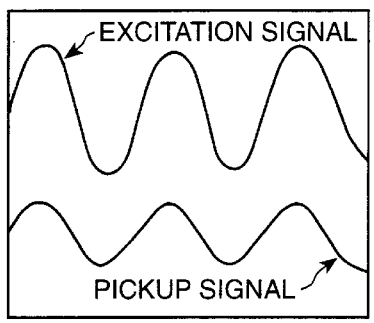
FIG. 5(a) shows waveforms of an excitation signal inputted to an oscillator and a pickup signal outputted from the oscillator measured by an oscilloscope shown in FIG. 3 when the excitation and pickup signals are in phase.
Figure 5B:
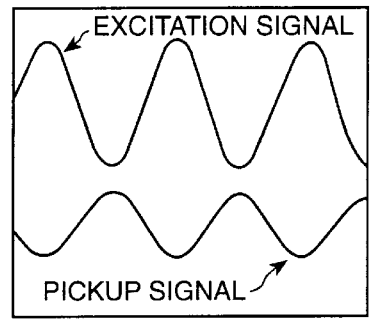
FIG. 5(b) shows waveforms of an excitation signal inputted to an oscillator and a pickup signal outputted from the oscillator measured by an oscilloscope shown in FIG. 3 when the excitation and pickup signals are 180° out of phase.
Figure 5C:
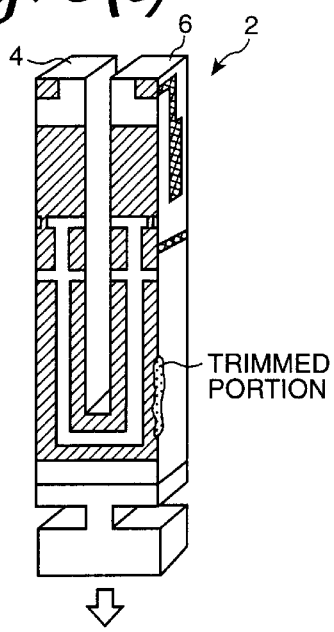
FIG. 5(c) is a perspective view which shows an oscillator wherein an edge of a right arm is trimmed away based on the relation between waveforms shown in FIG. 5(a)
Figure 5D:
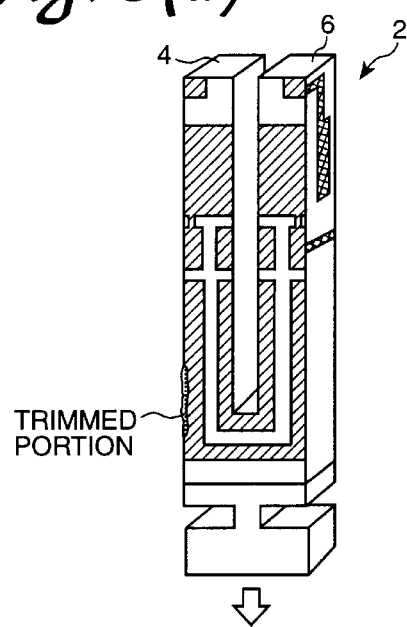
FIG. 5(d) a perspective view which shows an oscillator wherein an edge of a left arm is trimmed away based on the relation between the waveforms shown in FIG. 5(b)

For example, when the excitation signal and the pickup signal are in phase as shown in FIG. 5(a), a ridge or longitudinal edge of the right arm 6 between the surfaces X1 and Y2, as shown in FIG. 5(c), is trimmed away. Alternatively, when the excitation signal and the pickup signal are 180° out of phase, a longitudinal edge of the left arm 4 between the surfaces X1 and Y1, as shown in FIG. 5(d), is trimmed away. This decreases the amplitude of the pickup signal.

Figure 5E:
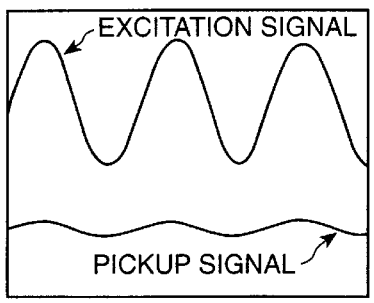
FIG. 5(e) shows waveforms of an excitation signal inputted to an oscillator and a pickup signal outputted from the oscillator after a right arm of the oscillator is trimmed away.
Figure 5F:
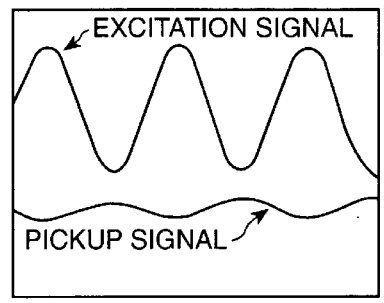
FIG. 5(f) shows waveforms of an excitation signal inputted to an oscillator and a pickup signal outputted from the oscillator after a left arm of the oscillator is trimmed away.

The trimming continues to be performed until the amplitude of the pickup signal becomes zero (0) or reaches the preselected threshold value as shown in FIGS. 5(e) and 5(f).

Figure 6A:
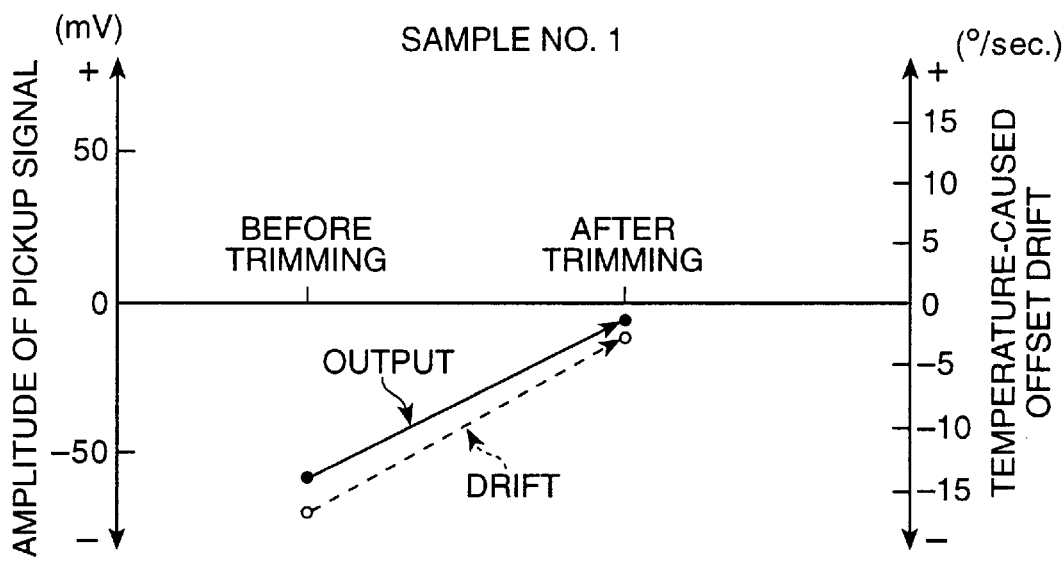
FIGS. 6(a) and 6(b) are graphs which illustrate the amplitude of pickup signals and temperature-caused offset drifts of oscillator samples No. 1 an No. 2, respectively.
Figure 6B:
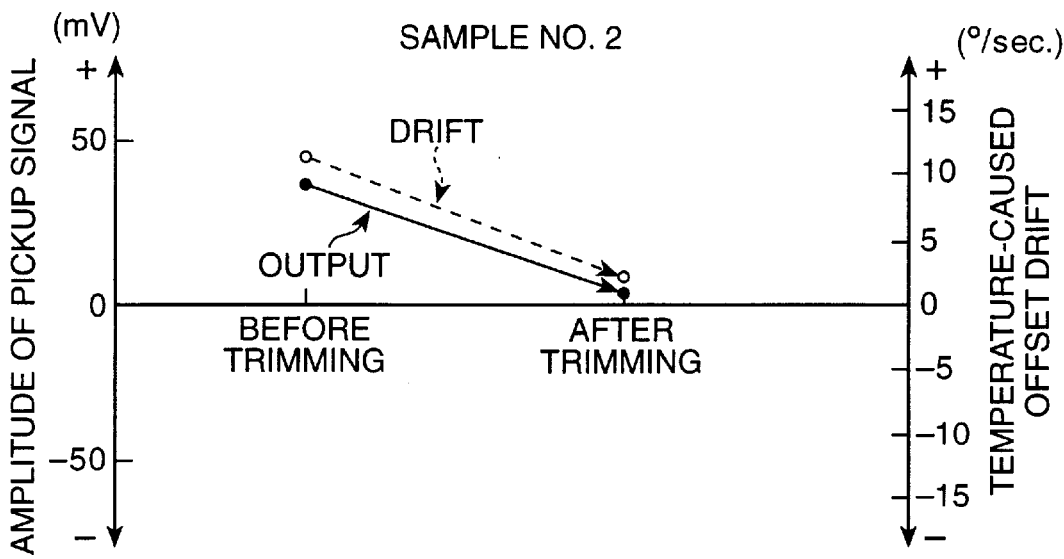

FIGS. 6(a) and 6(b) illustrate the amplitude of pickup signals and temperature-caused offset drifts of oscillator samples No. 1 and No. 2, respectively, before and after trimming the oscillator samples No. 1 and No. 2.

In the sample No. 1 of FIG. 6(a), the pickup signal and the excitation signal are in phase, and the pickup signal has an amplitude of 56.2 mV before the trimming, while after the longitudinal edge of the arm 6 between the surfaces X1 and Y2 is trimmed, the phases of the pickup signal and the excitation signal remain unchanged, but the amplitude of the pickup signal is lowered to approximately 5.6 mV. This causes the temperature-caused offset drift to be decreased from 17°/sec. to 3°/sec. In the sample No. 2 of FIG. 6(b), the pickup signal and the excitation signal are 180° out of phase, and the pickup signal has an amplitude of 37.5 mV before the trimming, while after the longitudinal edge of the arm 4 between the surfaces X1 and Y1 is trimmed, the phases of the pickup signal and the excitation signal remain unchanged, but the amplitude of the pickup signal is lowered to approximately 3.2 mV. This causes the temperature-caused offset drift to be decreased from 11°/sec. to 2°/sec.

The relation between the amount of a trimmed portion of the oscillator 2 and the temperature-caused offset drift will be described below with reference to FIG. 7.

When the excitation signal and the pickup signal are 180° out of phase with each other, trimming away an edge of the arm 4 between the surfaces X1 and Y1 first causes the amplitude of the pickup signal to be lowered, as shown in FIG. 7. Further trimming away the edge of the arm 4 causes the pickup signal to be reversed in phase so that it will be in phase with the excitation signal, resulting in an increase in amplitude of the pickup signal. Similarly, the temperature-caused offset drift is first decreased with the extent that the oscillation characteristic of the oscillator 2 is changed by trimming the arm 4, but a further increase in amount of the trimmed portion of the arm 4 causes the temperature-caused offset drift to be increased.

Similarly, trimming away an edge of the arm 6 between the surfaces X1 and Y2 first causes the amplitude of the pickup signal and the temperature-caused offset drift to be decreased. Therefore, if the pickup signal is, as described above, reversed in phase by the excessive trimming of the arm 4 so that the amplitude of the pickup signal and the temperature-caused offset drift are increased, these increases may be corrected easily by trimming away the edge of the other arm 6 between the surfaces X1 and Y2.

For the size of the oscillator 2 of this embodiment, the arms 4 and 6 each have a width of 2.0 mm and extend at an interval of 0.6 mm away from each other. The stem 8 has a width of 3 mm in the z-axis direction and a thickness of 2.1 mm. The arms 4 and 6 each have a thickness of 2.1 mm and an overall length of 20 mm. The supporter 32 has an overall width of 4 mm in the z-axis direction.

In the oscillator 2 of the above size, we found that when a portion of each of the arms 4 and 6 five millimeters away from the bottom interfacing with the stem 8 is trimmed away, the desired 20 effect is not obtained and that trimming away a portion of the oscillator 2 ranging from the bottom of each of the arms 4 to the stem 8 is effective for minimizing the temperature-caused offset drift. In order to decrease the temperature-caused offset drift as much as possible without causing physical damage the oscillator 2, it is advisable that either of the arms 4 and 6 and the stem 8 be trimmed and that the depth of a trimmed portion be as much as 0.5 mm, taking the physical damage to the oscillator 2 into account.

In the oscillator samples No. 1 and No. 2 shown in FIGS. 6(a) and 6(b), when the excitation signal and the pickup signal are in phase, the edge of the right arm 6 between the surfaces X1 and Y2 is trimmed away, while when the excitation signal and the pickup signal are 180° out of phase, the edge of the left arm 4 between the surfaces X1 and Y1 is trimmed away, but however, a portion of the oscillator 2 to be trimmed away first in order to minimize the amplitude of the pickup signal or the temperature-caused offset drift is not limited to the above and depends upon the shape and size of the oscillator 2. It is thus advisable that a portion of the oscillator 2 to be trimmed away first be determined experimentally based on the geometry thereof.

Figure 4B:
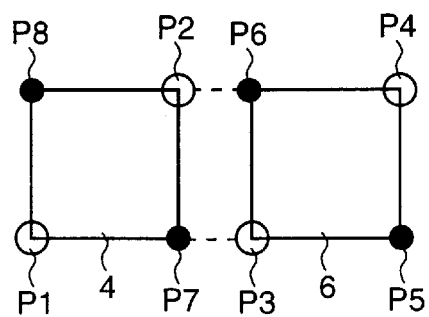
FIG. 4(b) illustration which shows trimmable corners of arms of an oscillator.

In a fork oscillator like the one shown in FIG. 1, changes in oscillatory characteristic of the oscillator 2 established by trimming away, as shown in FIG. 4(b), an outer edge P1 and an inner edge P2 of the left arm 4 and an inner edge P3 and an outer edge P4 of the right arm 6 are the same. Similarly, changes in oscillatory characteristic of the oscillator 2 established by trimming away an outer edge P5 and an inner edge P6 of the right arm 6 and an inner edge P7 and an outer edge P8 of the left arm 4 are the same. It is thus advisable that a portion(s) of the oscillator 2 to be trimmed away to adjust the temperature-caused offset drift be determined for ease of machining.

Figure 8:
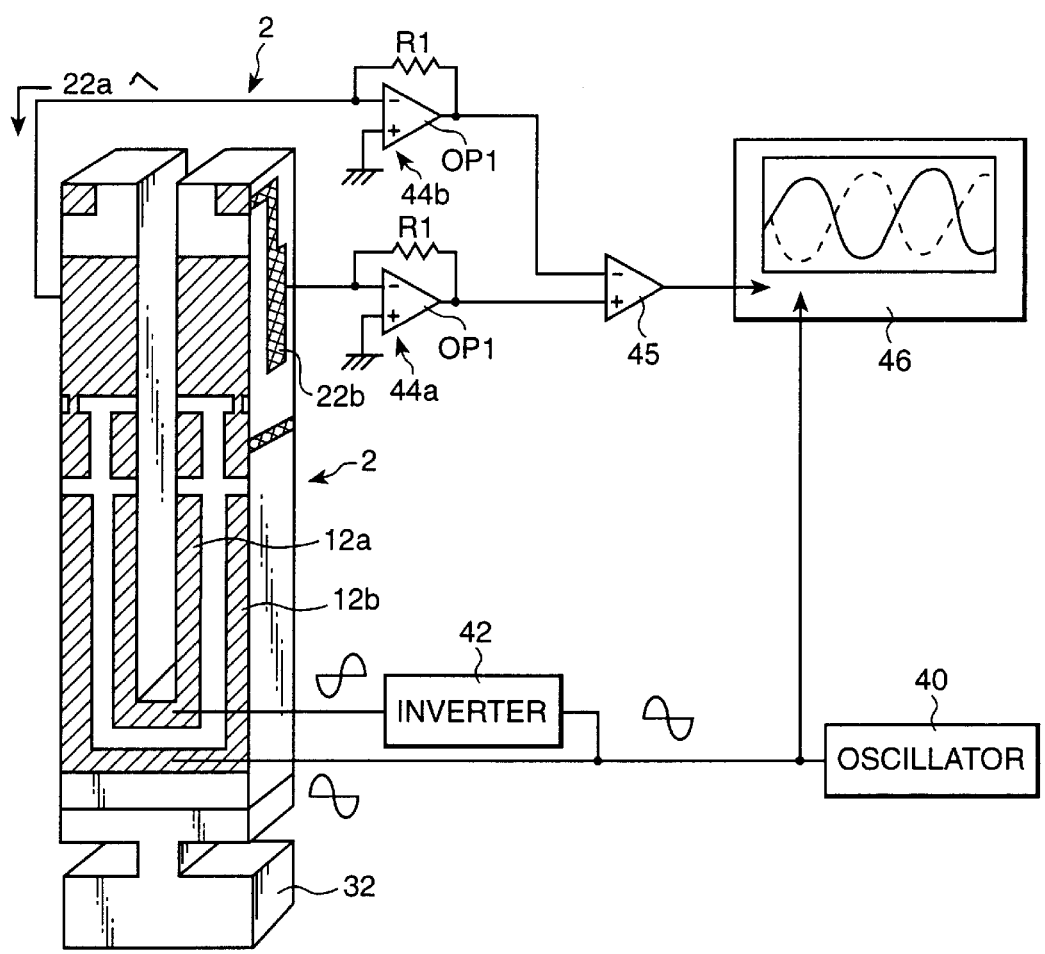
FIG. 8 is a circuit diagram which is a modification of an oscillation output monitoring circuit shown in FIG. 3.

The circuit shown in FIG. 3 detects the oscillation of the oscillator 2 in the pickup-axis direction (i.e., the x-axis direction) only using an output of the pickup electrode 22b disposed on the right arm 6, but may detect it, as shown in FIG. 8, using outputs of both the pickup electrodes 22a and 22b. In a circuit of FIG. 8, a pair of current-voltage converters 44a and 44b each consisting of an operational amplifier OP1 and a resistor R1 convert the outputs of the pickup electrodes 22a and 22b into voltage signals and provide them to a differential amplifier 45. The differential amplifier 45 amplifies the difference between the input voltage signals and provides it to the oscilloscope 46 as the pickup signal.

The oscillation of the oscillator 2 at the pickup oscillation frequency fs in the adjustment of the temperature-caused offset drift may also be established by applying an ac voltage across one of the drive electrodes 12a and 12b and the common virtual GND electrode 24.

FIG. 9 shows an angular rate sensor according to the second embodiment of the invention which is different from the one shown in FIG. 1 in that it has an oscillator 52 made of a square piezoelectric rod.

The oscillator 52 is retained at a node portion on a base 56 by a C-shaped supporter 54 made of metal (e.g., 42N). The oscillator 52 has, as can be seen in FIGS. 10(a) to 10(d), substantially the same structure as that of the arm 6 shown in FIG. 1. Specifically, drive electrodes 58a and 58b, a monitor electrode 60, a virtual GND electrode 62, a polarizing electrode 64, and a pad electrode 66 are, as shown in FIG. 10(b), formed on the surface X1 of the oscillator 52. On the surface Y2, as shown in FIG. 10(c), a pickup electrode 68, a lead electrode 66a, and a short-circuit electrode 62b are formed. The pickup electrode 68 is connected to the pad electrode 66 through the lead electrode 66a. On the surface X2, a common virtual GND electrode 70 is, as shown in FIG. 10(d), formed in connection with the virtual GND electrode 62 through the shortcircuit electrode 62b. The virtual GND electrode 62 is connected to the polarizing electrode 64 through a short-circuit electrode 62a.

The drive electrodes 58a and 58b, the monitor electrode 60, the pad electrode 66, and the pickup electrode 68 are kept at a reference potential of the common virtual GND electrode 70. All the electrodes are made of a conductive material such as silver and have a thickness of approximately 10 μm.

The common virtual GND electrode 70 need not be formed over the whole of the surface X2 of the oscillator 52 and may alternatively be formed in a mirror image of the electrodes on the surface X1.

The oscillator 51 is polarized uniformly in the x-axis direction from the surface X1 to the surface X2 in the same manner as that of the one shown in FIG. 1.

The base 56 supports the oscillator 52 so that the surface X2 extends in parallel to the surface of the base 56 and has disposed thereon terminals T11 to T15 connecting with the drive electrodes 58a and 58b, the monitor electrode 60, the virtual GND electrode 62, and the pad electrode 66 through wires W11 to W15, respectively. The glass material is loaded into a clearance between the periphery of each of the terminals T11 to T15 and a mount hole formed in the base 56 for electrical isolation and hermetic sealing.

In operation, the ac excitation voltages that are 180° out of phase with each other are applied across the common virtual GND electrode 70 and the drive electrodes 58a and 58b to oscillate the oscillator 52 in the y-axis direction. During the oscillation, an output of the monitor electrode 60 is monitored through the terminal T13 to control the ac excitation voltages for maintaining the oscillation of the oscillator 52 constant. When the angular rate sensor is moved at the angular rate Ω around the z axis (i.e., the longitudinal center line of the oscillator 52), it will cause the Coriolis force to be produced which acts on the oscillator 52 to vibrate it in the x-axis direction. This produces a current flow between the pickup electrode 68 and the common virtual GND electrode 70 which is proportional to the angular rate Ω. The current flow is then converted into a voltage signal in the same manner as described in the first embodiment.

The adjustment of the temperature-caused offset drift of the a oscillator 52 may be achieved in the same manner as discussed with reference to FIG. 3 by trimming away a portion of the oscillator 52 near the supporter 54.

Figure 11:
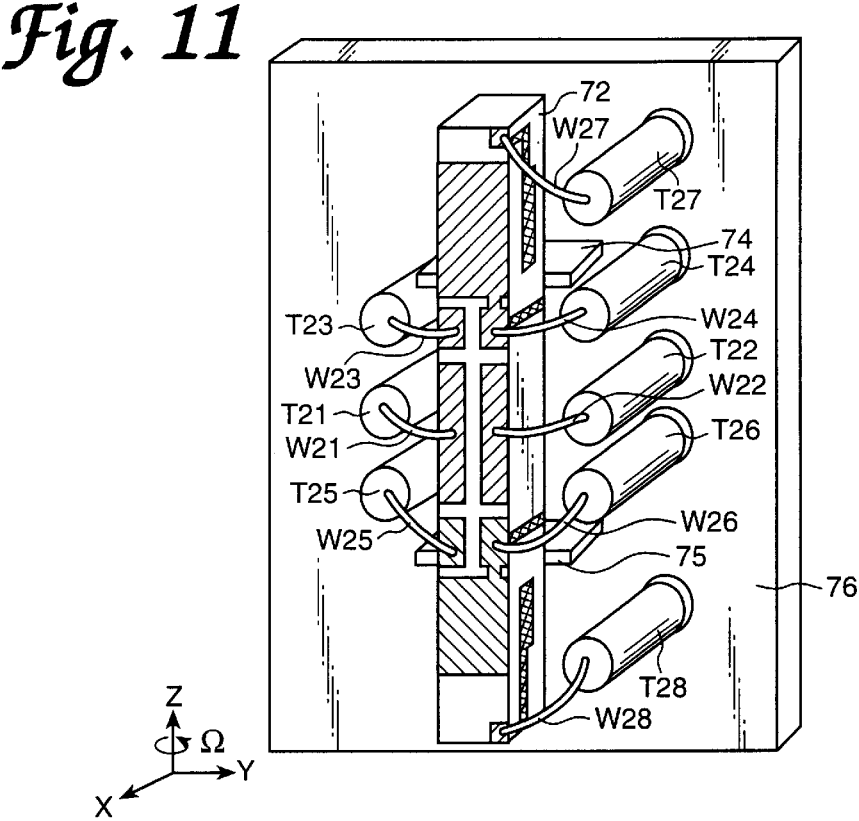
FIG. 11 is a perspective view which shows an angular rate sensor that is a modification of the second embodiment shown in FIG. 9.

FIG. 11 shows angular rate sensor that is a modification of the second embodiment shown in FIG. 9.

The oscillator 72 is made of a square piezoelectric bar and secured at two node portions on a base 76 through resinous supporters 74 and 75.

Figure 12A:
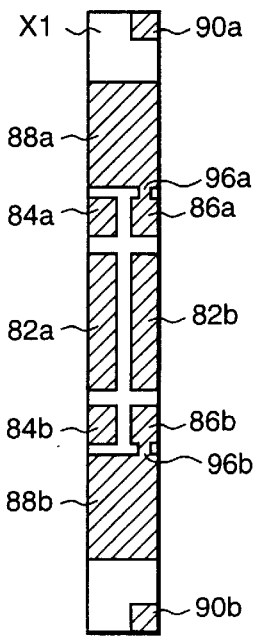
FIGS. 12(a) to 12(d) show electrodes formed on surfaces of an oscillator in FIG. 11.
Figure 12B:
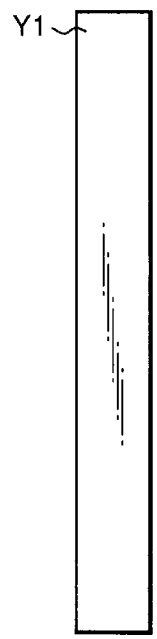
Figure 12C:
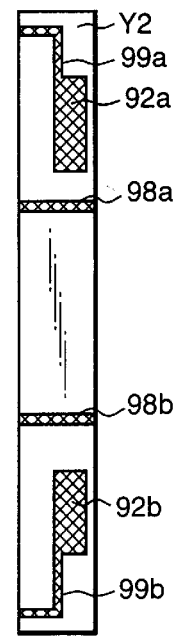
Figure 12D:
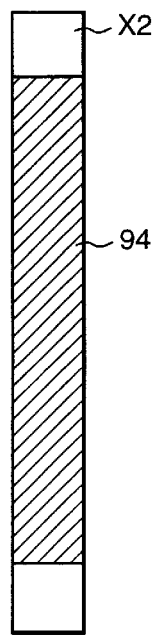

The oscillator 72 has disposed on the surface X1, as shown in FIG. 12(a), drive electrodes 82a and 82b, monitor electrodes 84a and 84b, virtual GND electrodes 86a and 86b, polarizing electrodes 88a and 88b, pad electrodes 90a and 90b, and short-circuit electrodes 96a and 96b which are arranged in symmetry with respect to a lateral center line of the oscillator 72. The short-circuit electrodes 96a and 96b connect the virtual GND electrodes 86a and 86b with the polarizing electrodes 88a and 88b, respectively. On the surface X2, a common virtual GND electrode 94 is, as shown in FIG. 12(d), formed. On the surface Y2, pickup electrodes 92a and 92b, lead electrodes 99a and 99b, and short-circuit electrodes 98a and 98b are, as shown in FIG. 12(c), formed to be symmetrical with respect to the lateral center line of the oscillator 72. The lead electrodes 99a and 99b connect with the pad electrodes 90a and 90b, respectively. The short-circuit electrodes 98a and 98b connects the common virtual GND electrode 94 with the virtual GND electrodes 86a and 86b. All the electrodes are made of a conductive material such as silver and have a thickness of approximately 10 μm.

The oscillator 72 is made in the same manner as that of the oscillator 2 in FIG. 1 and polarized uniformly in the x-axis direction from the surface X1 to the surface X2.

The base 76 supports the oscillator 72 so that the surface X2 extends in parallel to the surface of the base 76 and has disposed thereon terminals T21 to T28 connecting with the drive electrodes 82a and 82b, the monitor electrode 84a, the virtual GND electrode 86a, the monitor electrode 84b, the virtual GND electrode 86b, the pad electrodes 90a and 90b through wires W21 to W28, respectively. The glass material is loaded into a clearance between the periphery of each of the terminals M21 to M28 and a mount hole formed in the base 76 for electrical isolation and hermetic sealing.

In operation, the ac excitation voltages that are 180° out of phase with each other are applied across the common virtual GND electrode 94 and the drive electrodes 82a and 82b to oscillate end portions of the oscillator 72 outside the supporters 74 and 75 in the y-axls direction. During the oscillation, outputs of the monitor electrode 84a and 84b are monitored through the terminal T23 and T25 to control the ac excitation voltages for maintaining the oscillation of the oscillator 72 constant. When the angular rate sensor is moved at the angular rate Ω around the z axis (i.e., the longitudinal center line of the oscillator 72), it will cause the Coriolis force to be produced which acts on the oscillator 72 to vibrate the end portions thereof in the x-axis direction.

This produces current flows between the pickup electrodes 92a and 92b and the common virtual GND electrode 94. The current flows are converted into voltage signals. The voltage signals are also converted through a differential amplifier (not shown) into a sensor output that is the difference between the input voltage signals and that indicates the angular rate Ω acting on the angular rate sensor.

The adjustment of the temperature-caused offset drift of the oscillator 72 may be achieved using the system in FIG. 3 or 8 by trimming away an edge portion(s) near either or both of the drive electrodes 82a and 82b.

Figure 13:
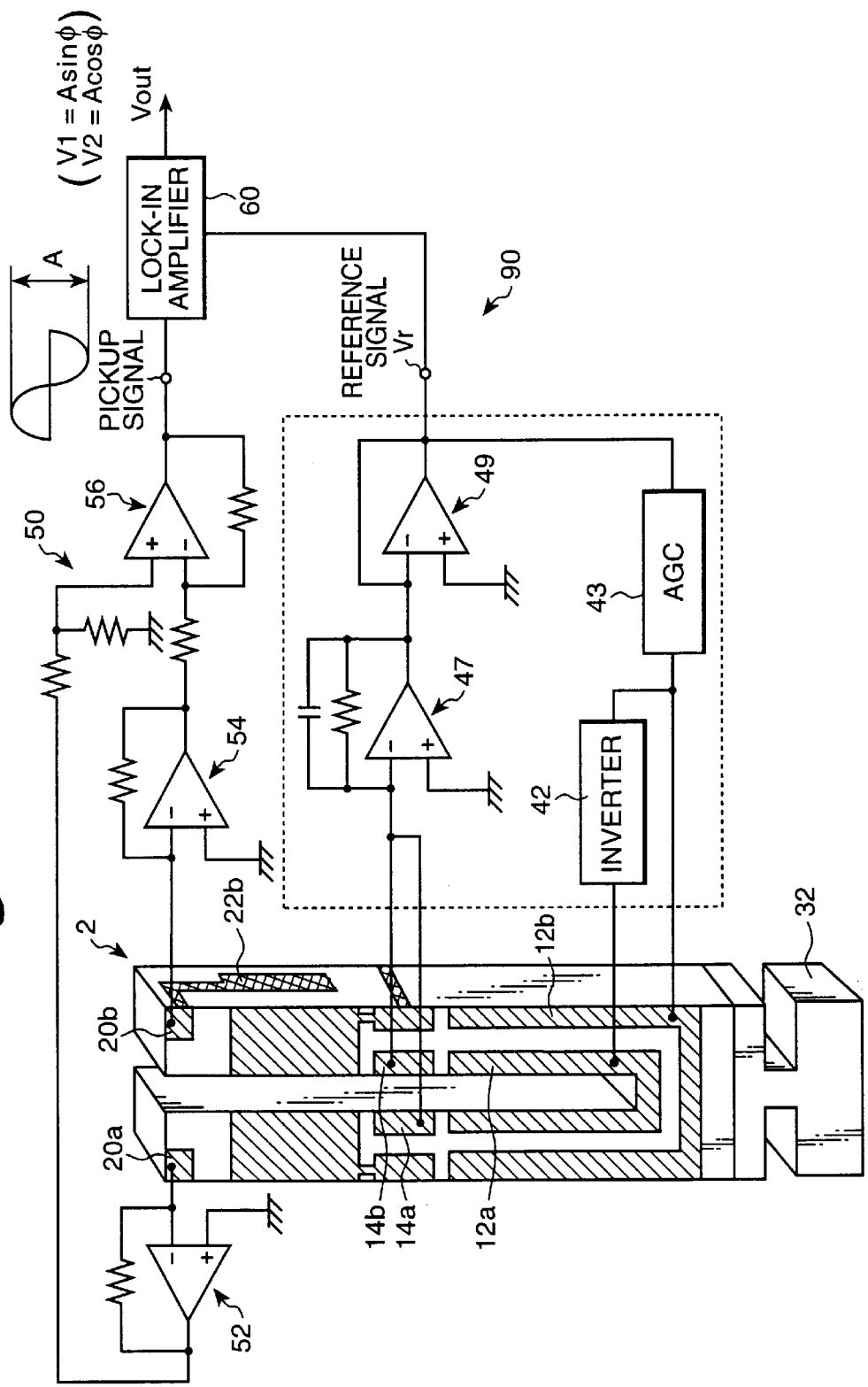
FIG. 13 is a circuit diagram which shows a sensor control circuit used to adjust a temperature-caused offset drift and to measure an angular rate acting on an angular rate sensor.
Figure 14A:
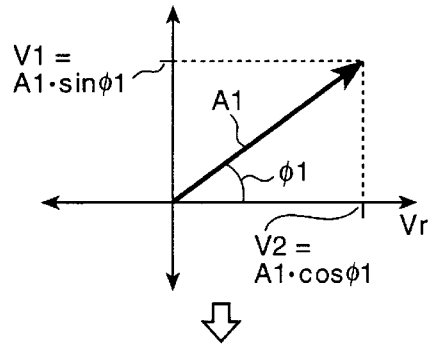
FIGS. 14(a) and 14(b) show phase relations between an orthogonal signal component V1 and an equiphase signal component V2 of a pickup signal outputted from an oscillator and a reference signal Vr outputted from a self-excited oscillation circuit 40 in FIG. 13.
Figure 14B:
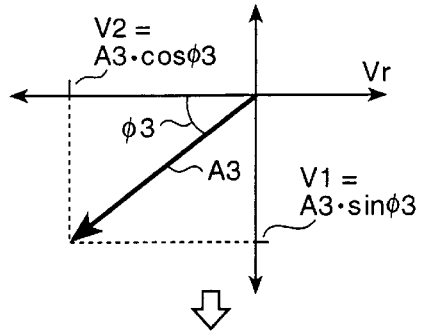
Figure 14C:
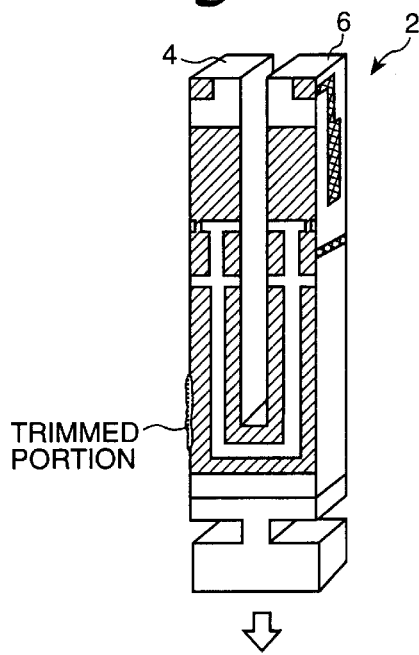
FIG. 14(c) is a perspective view which shows an oscillator wherein an edge of a left arm is trimmed away when an equiphase signal component V2 is, as shown in FIG. 14(a), in phase with a reference signal Vr.
Figure 14D:
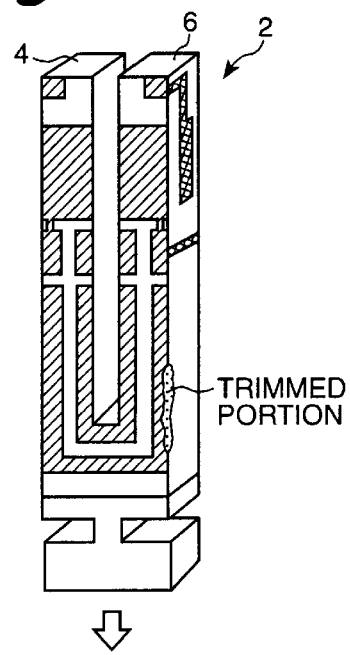
FIG. 14(d) is a perspective view which shows an oscillator wherein an edge of a right arm is trimmed away when an equiphase signal component V2 is, as shown in FIG. 14(a), 180° out of phase with a reference signal Vr.
Figure 14E:
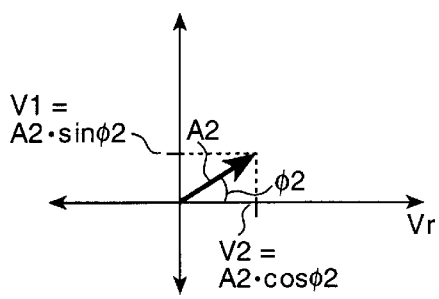
FIGS. 14(e) and 14(f) show phase relations between an orthogonal signal component V1 and an equiphase signal component V2 of a pickup signal outputted from an oscillator and a reference signal Vr outputted from a self-excited oscillation circuit 40 in FIG. 13 after left and right arms of the oscillator are trimmed, respectively.
Figure 14F:
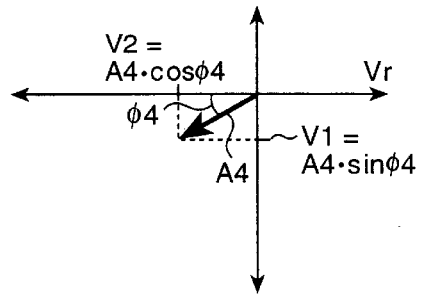

FIG. 13 shows a sensor control circuit 90 used to adjust the temperature-caused offset drift. The sensor control circuit 90 may also be used to measure an angular rate acting on the angular rate sensor, which will be first discussed below.

The sensor control circuit 90 generally includes a self-excited oscillation circuit 40 and a detection circuit 50. The self-excited oscillation circuit 40 consists of an automatic gain control 43, a phase inverter 42, a charge amplifier 46, and a buffer circuitry 49. The detection circuit 50 consists of current-voltage converters 52 and 54, a differential amplifier 56, and a lock-in amplifier 60.

When the angular rate is measured, the automatic gain control 43 outputs ac excitation signals to the drive electrode 12b and the phase inverter 42. The phase inverter 42 inverts the input in phase to provide to the drive electrode 12a an ac excitation signal which is 180° out of phase with the ac excitation signal inputted directly to the drive electrode 12b. The ac excitation signals have the frequency that is the resonant frequency of the oscillator 2 at which the arms 4 and 6 vibrate in the y-axis direction in FIG. 1.

The oscillations of the arms 4 and 6 caused by the application of the ac excitation signals are monitored by picking up charge signals appearing at the monitor electrodes 14a and 14b through the charge amplifier 47. The charge amplifier 47 converts the inputs into a voltage signal and feeds it back to the automatic gain control 43 through the buffer circuitry 49. The automatic gain control 43 controls the self-excited oscillation of the oscillator 2 so as to maintain the level of the input signal from the buffer circuitry 49 (i.e., the amplitude of oscillation of the oscillator 2 in the excitation axis).

When the angular rate sensor is moved at the angular rate Ω around the z axis during the self-excited oscillation control, it will cause the Coriolis force to be produced which vibrates the arms 4 and 6 in opposite directions in the pickup-axis direction. This vibration produces current flows between the pickup electrodes 22a and 22b and the virtual GND electrode 24 which are proportional to the angular rate Ω. The current flows are picked up from the terminals T7 and T8 and inputted to the detection circuit 50. The detection circuit 50 converts the input current signals into voltage signals through the current-voltage converters 52 and 54, respectively, and provides them to the differential amplifier 56. The differential amplifier 56 amplifies the difference between the input voltage signals and outputs it as a pickup signal indicating the angular rate Ω acting on the angular rate sensor through the lock-in amplifier 60.

In the adjustment of the temperature-caused offset drift in manufacturing processes of the oscillator 2, 180° out of phase ac excitation signals having the pickup oscillation frequency fs are inputted to the drive electrodes 12a and 12b from the self-excited oscillation circuit 40 to oscillate the arms 4 and 6. The output of the buffer circuitry 49 is inputted to the lock-in amplifier 60 as the reference signal Vr.

Similarly, the output of the differential amplifier 56 (i.e., an offset signal) is inputted to the lock-in amplifier 60 as the pickup signal.

The lock-in amplifier 60 extracts from the pickup signal an orthogonal signal component V1 (=Asinφ) that is 90° out of phase with the reference signal Vr and an equiphase signal component V2 (=Acosφ) that is either in phase or 180° out of phase with the reference signal Vr or a combination of the components V1 and V2. The lock-in amplifier 60 monitors the orthogonal signal components V1 to determine whether it is +90° or −90° (i.e., +270°) out of phase with the reference signal Vr and also monitors the equiphase signal component V2 to determine whether it is in phase or 180° out of phase with the reference signal Vr. Based on results of the determinations, an edge portion near the bottom of the arm(s) of the oscillator 2 is trimmed away in the same manner as shown in FIGS. 4(*a*) and 4(*b*) until the amplitude A, as shown in FIG. 13, of each of the signal components V1 and V2 or the combination thereof becomes zero (0) or less than a preselected threshold level.

For example, when the equiphase signal component V2 is, as shown in FIG. 14(*a*), in phase with the reference signal Vr, a longitudinal edge of the left arm 4 between the surfaces X1 and Y1, as shown in FIG. 14(*c*), is trimmed away. Alternatively, when the equiphase signal component V2 and the reference signal Vr are in 180° phase opposition, a longitudinal edge of the right arm 6 between the surfaces X1 and Y2, as shown in FIG. 14(*d*), is trimmed away. This causes the equiphase signal component V2 or amplitude of the pickup signal (i.e., the undesired oscillation of the oscillator 2 accounting for the temperature-cause offset drift) to be decreased. The trimming continues to be performed until the amplitude of the pickup signal becomes zero (0) or reaches the preselected threshold value as shown in FIGS. 14(*e*) and 14(*f*).

The temperature-caused offset drift may also be minimized in the same manner as described above using the orthogonal signal component V1 and the combination of the signal components V1 and V2.

Figure 15A:
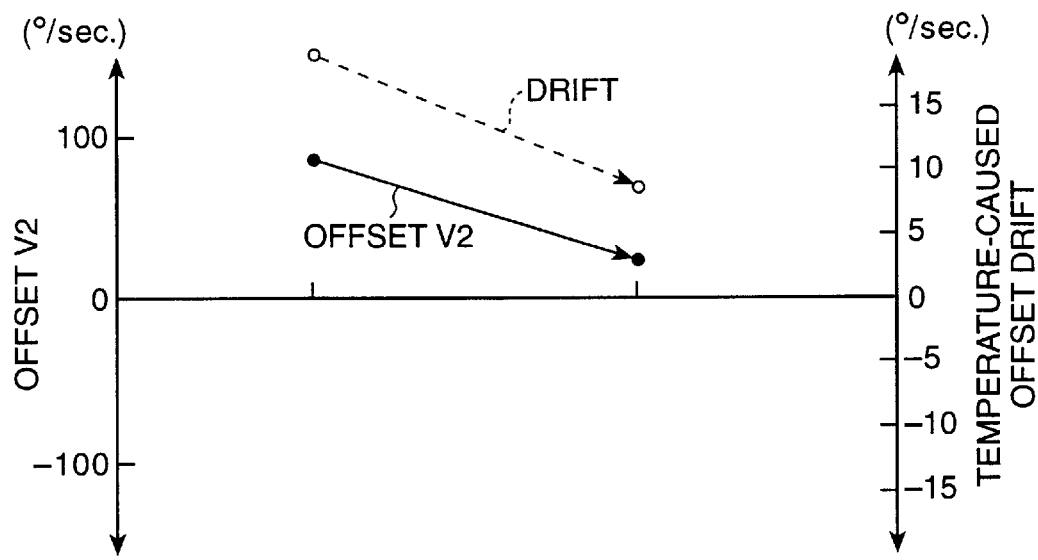
FIGS. 15(a) and 15(b) graphs which illustrate variations in equiphase signal component and temperature-caused offset drift of oscillator samples No. 1 and No. 2, respectively.
Figure 15B:
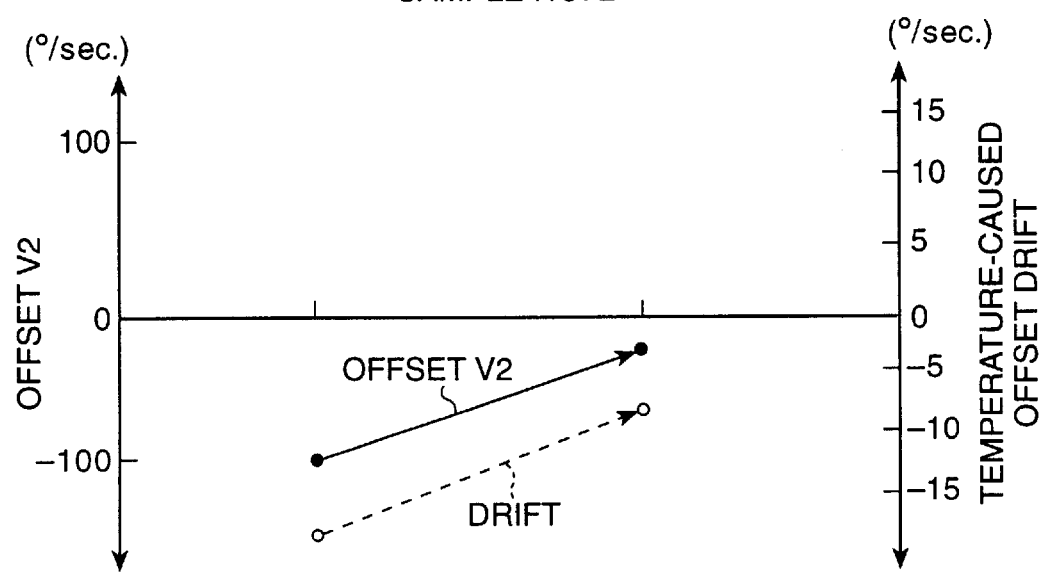

FIGS. 15(*a*) and 15(*b*) illustrate the relations between the equiphase signal components V2 and temperature-caused offset drifts of oscillator samples No. 1 and No. 2, respectively, before and after trimming the oscillator samples No. 1 and No. 2.

In the sample No. 1 of FIG. 15(*a*), trimming away an edge portion of the left arm 4 between the surfaces X1 and Y1 causes the equiphase signal component V2 (simply referred to as an offset V2 below) to be decreased from +83°/sec. to +21°/sec. This results in a decrease in temperature-caused offset drift from +19°/sec. to +7.61°/sec.

In the sample No. 2 of FIG. 15(*b*), trimming away an edge portion of the right arm 6 between the surfaces X1 and Y2 causes the offset V2 to be decreased from −99.1°/sec. to −23.6°/sec. This results in a decrease in temperature-caused offset drift from −18°/sec. to −8.2°/sec.

Figure 16A:
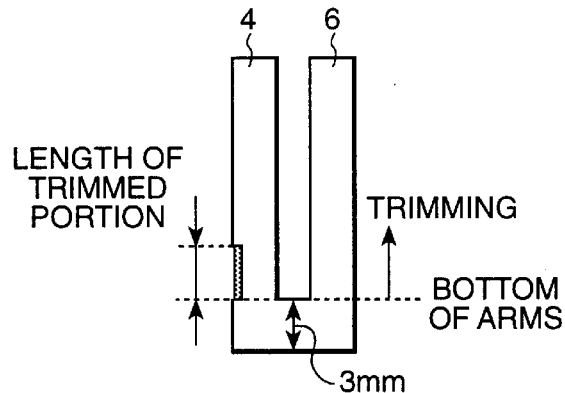
FIG. 16(a) is an illustration which shows a portion of an arm of an oscillator to trimmed away.
Figure 16B:
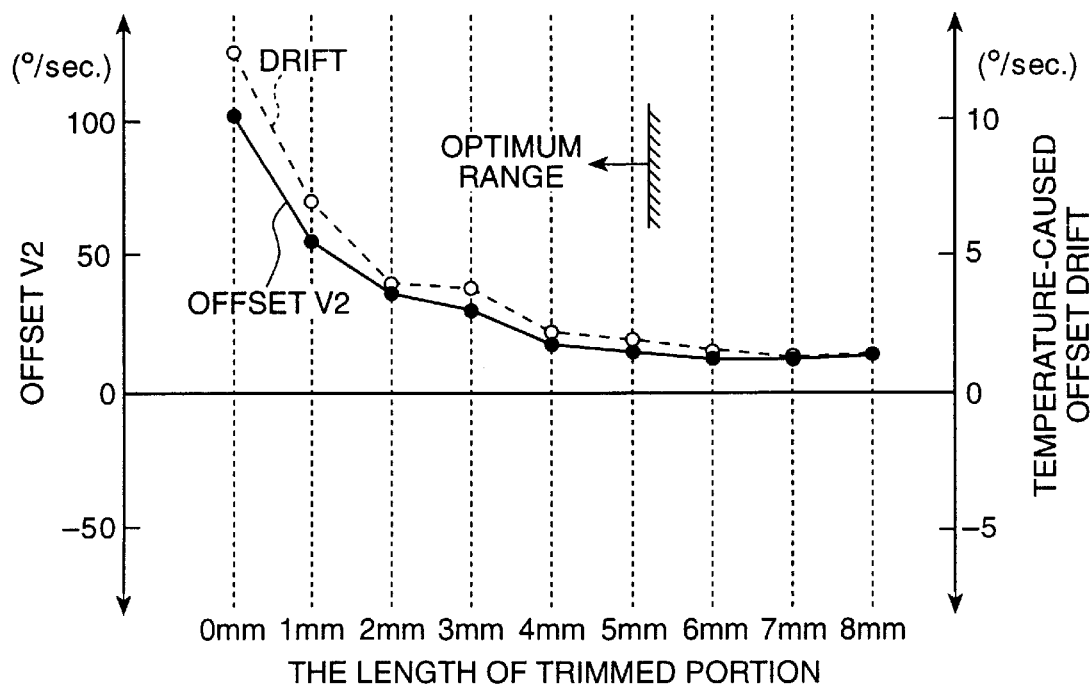
FIG. 16(b) is a graph which shows variations in equiphase signal component and temperature-caused offset drift according to the length of a trimmed portion of the oscillator shown in FIG. 16(a)

FIG. 16(*b*) is a graph which shows reductions in offset V2 and temperature-caused offset drift when an edge portion of the oscillator 2 of this embodiment above the bottoms of the arms 4 and 6 neighboring the stem 8 is, as shown in FIG. 16(*a*), trimmed away.

The graph shows that trimming away an edge portion of the oscillator 2 one millimeter (1 mm) from the bottoms of the arms 4 and 6 causes great reductions in offset V2 and temperature-caused offset drift, further trimming the oscillator 2 causes the reductions in offset V2 and temperature-caused offset drift to be lowered, and triuning away a portion of the oscillator 2 more than five millimeters (5 mm) apart above the bottoms of the arms 4 and 6 causes the offset V2 and the temperature-caused offset drift to be hardly decreased. The length of a portion of the oscillator 2 to be trimmed away, as already described depends upon the shape and size of the oscillator 2. It is thus appreciated from the graph that a great reduction in temperature-caused offset drift requires trimming away an edge portion of the oscillator 2 above the bottoms of the arms 4 and 6 neighboring the stem 8 that corresponds to 170% (approximately 5.1 mm in this embodiment) of the width of the stem 8 in the x-axis direction (3 mm in this embodiment as shown in FIG. 16(*a*)).

Figure 17A:
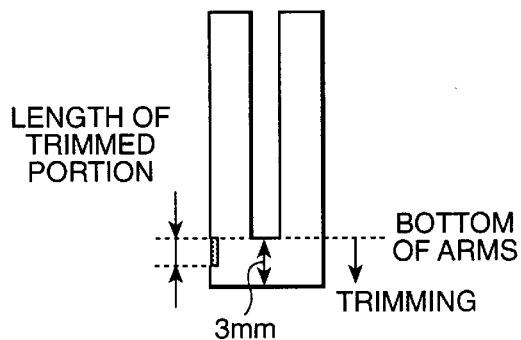
FIG. 17(a) is an illustration which shows a portion of a stem of an oscillator to be trimmed away.
Figure 17B:
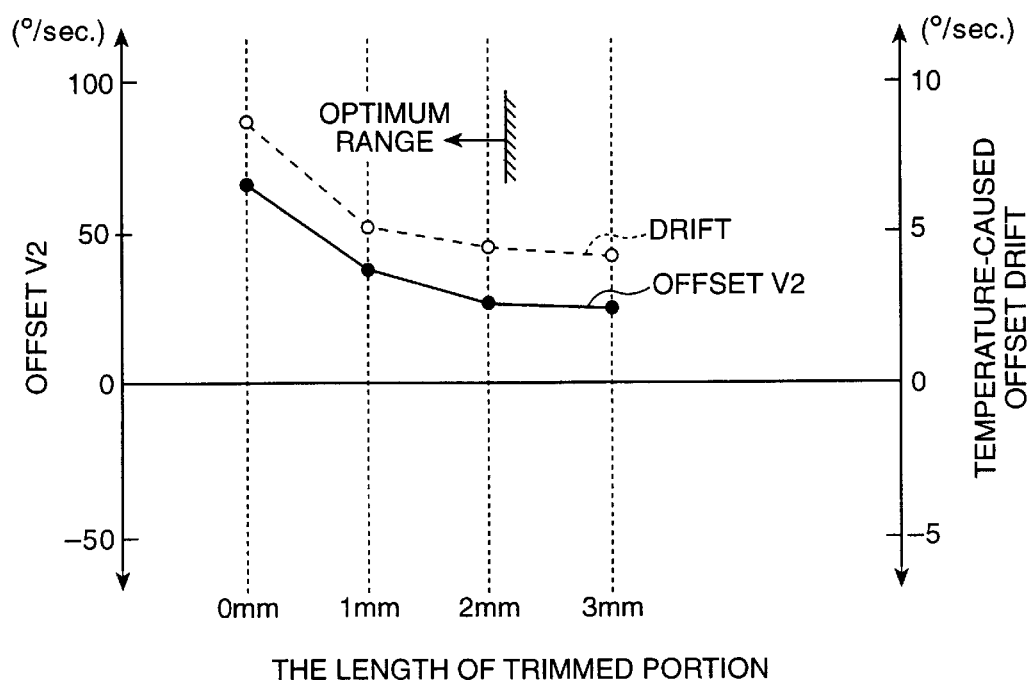
FIG. 17(b) is a graph which shows variations in equiphase signal component and temperature-caused offset drift according to the length of a trimmed portion of the oscillator shown in FIG. 17(a)

FIG. 17(*b*) is a graph which shows reductions in offset V2 and temperature-caused offset drift when an edge portion of the oscillator 2 of this embodiment beneath the bottoms of the arms 4 and 6 is, as shown in FIG. 17(*a*), tummed away.

The graph shows that trimming away an edge portion of the stem 8 one millimeter (1 mm) below the bottoms of the arms 4 and 6 causes great reductions in offset V2 and temperature-caused offset drift, further trimming the stem 8 causes the reductions in offset V2 and temperature-caused offset drift to be lowered, and trimming away a portion of the stem 8 more than two millimeters (2 mm) apart below the bottoms of the arms 4 and 6 causes the offset V2 and the temperature-caused offset drift to be hardly decreased. It is thus appreciated from the graph that a great reduction in temperature-caused offset drift requires trimming away an edge portion of the stem 8 below the bottoms of the arms 4 and 6 that corresponds to 70% (approximately 2.1 mm in this embodiment) of the width of the stem 8 in the x-axis direction (3 mm in this embodiment as shown in FIG. 17(*a*)).

An edge portion of the oscillator 2 to be trimmed away may occupy both the stem 8 and one of the arms 4 and 6 within the ranges as described above.

An edge portion of the oscillator 2 may be trimmed away in a lengthwise direction thereof while keeping the depth constant, and vice versa.

In order to decrease the temperature-caused offset drift as much as possible without causing physical damage to the oscillator 2, it is advisable that either of the arms 4 and 6 and the stem 8 be trimmed and that the depth of a removed portion be as much as 0.5 mm, taking the physical damage to the oscillator 2 into account.

Figure 18:
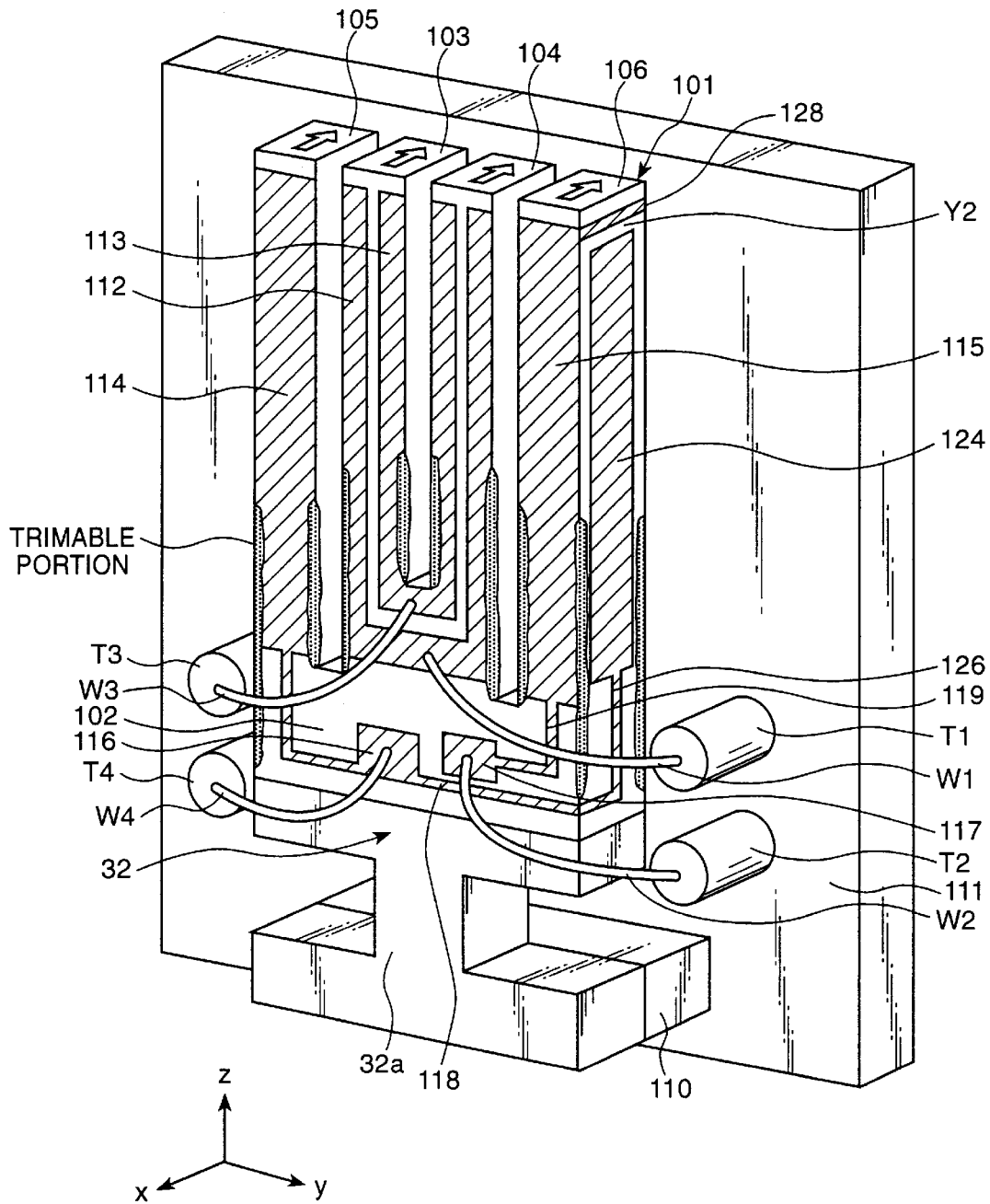
FIG. 18 is a perspective view which shows an angular rate sensor according to the third embodiment of the invention.

FIG. 18 shows an angular rate sensor according to the third embodiment of the invention.

The angular rate sensor includes an four-pronged oscillator 101, an H-shaped supporter 107, a spacer 110, and a base 111. The oscillator 101 is made of a single piece of piezoelectric material and machined, for example, in a dicing technique to have a pair of driving arms 103 and 104, a pair of detecting arms 105 and 106, and a stem 102. The driving arms 103 and 104 are, as can be seen in the drawing, shorter than the detecting arms 105 and 106. The stem connects the arms 103 to 106 in parallel. The supporter 107 includes a torsion beam 108 and is glued to the bottom of the stem 102 of the oscillator 101 so that the torsion beam 108 extends along the longitudinal center line of the oscillator 101. The supporter 107 is welded to the spacer 110. The spacer 110 is also welded to the surface of the base 111 to secure the oscillator 101 on the base 111 so that the arms 103 to 106 extend in parallel at a given interval away from the base 111.

Figure 19:
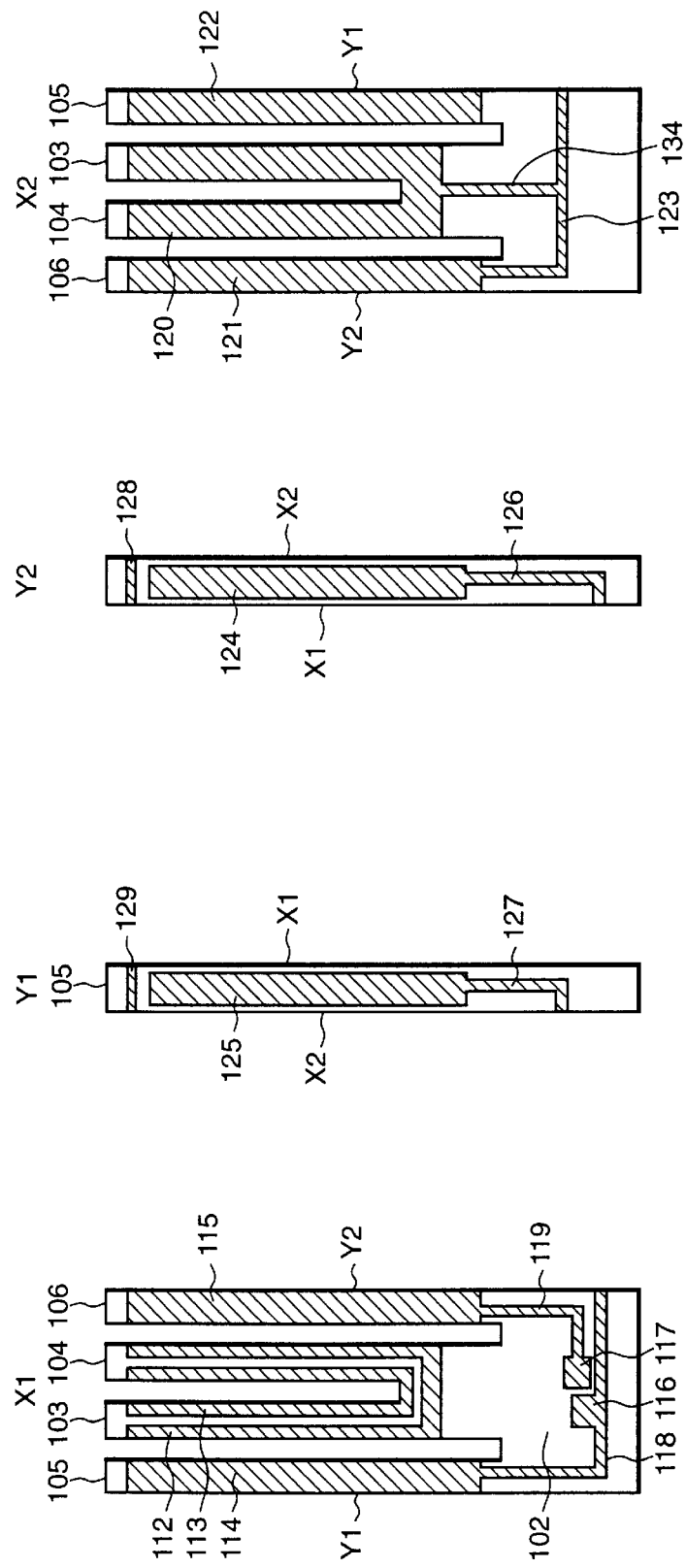
FIGS. 19(a) to 19(d) show electrodes formed on surfaces of an oscillator in FIG. 18.

The oscillator 101 has formed on the surface X1, as shown in FIG. 19(*a*), a U-shaped driving electrode 112, a U-shaped monitor electrode 113, a pickup electrode 114, and a common electrode 115. The driving and monitor electrodes 112 and 113 extend over the driving arms 103 and 104. The pickup electrode 114 is arranged on the arm 105 and connected to a pad electrode 116 through a lead electrode 118. The common electrode 115 is arranged on the arm 106 and connected to a pad electrode 117 through a lead electrode 119. On the surface X2, as shown in FIG. 19(d), a U-shaped common electrode 120 is formed on the arms 103 and 104 which is grounded or kept at a reference potential. A common electrode 121 is formed on the arm 106. A pickup electrode 122 is formed on the arm 105 in connection with the pickup electrode 114 through a short-circuit electrode 129 formed on the surface Y2, as shown in FIG. 19(c). The common electrodes 120 and 121 are connected to a common electrode 125 formed on the surface Y2 through lead electrodes 123 and 127. On the surface Y1, as shown in FIG. 19(b), a short circuit electrode 128, a pickup electrode 124, and a lead electrode 126 are formed. The short circuit electrode 128 connects the common electrodes 115 and 121. The pickup electrode 128 is connected to the pickup electrode 114 through the lead electrodes 126 and 118.

The base 111 has disposed thereon terminals T1 to T4 which are connected to the driving electrode 112, the pad electrode 117, the monitor electrode 113, and the pad electrode 116 through the wires W1 to W4, respectively.

The oscillator 101 is polarized uniformly in a direction, as indicated by white arrows in FIG. 18, and trimmed in the same manner as described above to minimize the temperature-caused offset drift.

In operation, the ac excitation voltage is applied across the common electrode 120 and the driving electrode 112 to vibrate the arms 103 and 104 in opposite directions in an oscillation mode along the y axis. During the oscillation, an output of the monitor electrode 113 is monitored through the terminal T3 to control the ac excitation voltage for maintaining the amplitude of the oscillation of the arms 103 and 104 constant. When the angular rate sensor is moved at the angular rate Ω around the z axis (i.e., the longitudinal center line of the oscillator 101 extending between the arms 103 and 104), it will cause the Coriolis force to be produced which acts on the arms 103 and 104 to vibrate them in opposite directions along the x axis. This also vibrates the arms 105 and 106 along the x axis. The pickup electrodes 114, 122, and 124 produce a vibration signal having the amplitude proportional to the angular rate Ω acting on the angular rate sensor.

Figure 20:
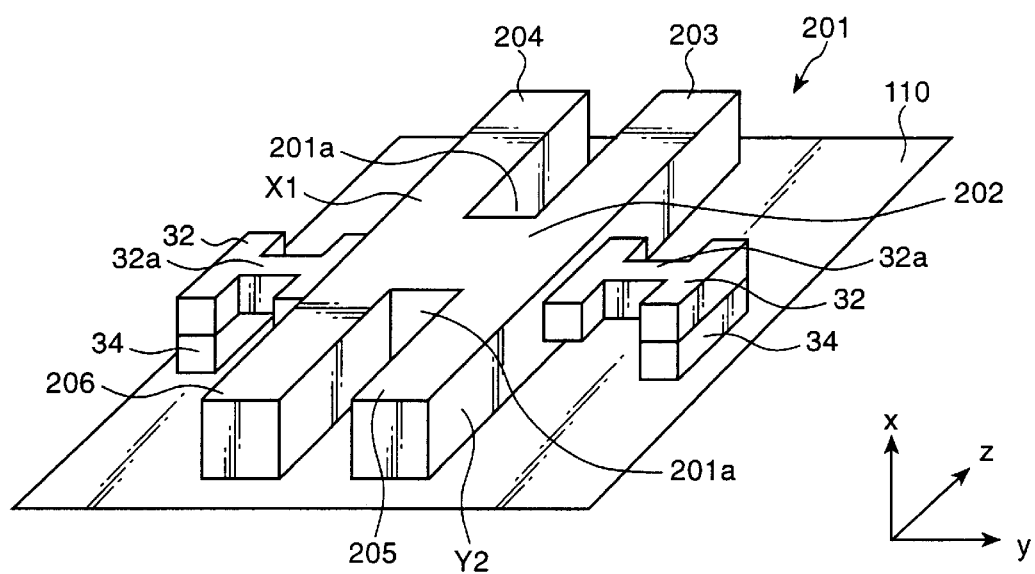
FIG. 20 is a perspective view which shows an angular rate sensor according to the fourth embodiment of the invention.

FIG. 20 shows an angular rate sensor according to the fourth embodiment of the invention which includes an H-shaped oscillator 201 and abase 110.

The oscillator 201 is made of a single piece of piezoelectric material and machined, for example, in a dicing technique to have a pair of driving arms 203 and 204, a pair of detecting arms 205 and 206, and a stem 202.

Figure 21:
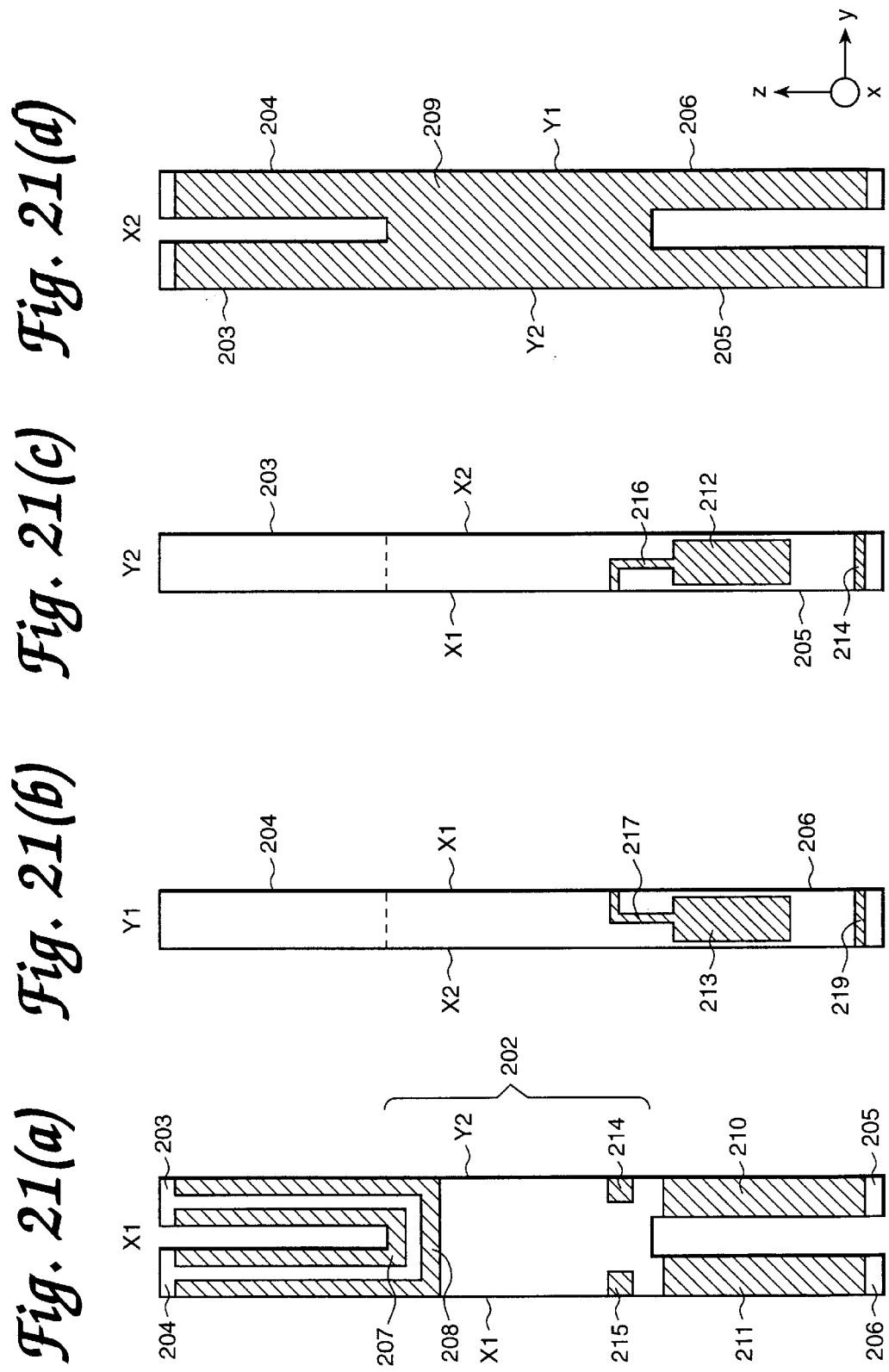
FIGS. 21(a) to 21(d) show electrodes formed on surfaces of an oscillator in FIG. 20.

The oscillator 201 has formed on the surface X1, as shown in FIG. 21(a), a U-shaped driving electrode 207, a U-shaped monitor electrode 208, pad electrodes 214 and 215, and common electrodes 210 and 211. The driving and monitor electrodes 207 and 208 extend over the driving arms 203 and 204. The pad electrodes 214 and 215 are attached to the stem 202 in connection with pickup electrodes 212 and 213 through lead electrodes 216 and 217 which are, as shown in FIGS. 21 (c) and 21 (b), formed on the surfaces Y2 and Y1, respectively. The common electrodes 210 and 211 are attached to the detecting arms 205 and 206 in connection with a common electrodes 209 formed on the surface X2 through short-circuit electrodes 214 and 219, respectively. The common electrode 209 is grounded or kept at a reference potential.

The oscillator 202 is retained by the base 110 using a pair of H-shaped supporters 32 each having the same structure as the ones shown in the above embodiments. The supporters 32 are attached at ends thereof to the base 110 through spacers 34 and at the other ends to side walls of the stem 202 to support the oscillator 202, respectively.

The oscillator 201 may alternatively be installed on the base 110 by attaching a C-shaped supporter to the stem 202 in tight engagement with side walls 201a of the stem 202.

The oscillator 201 is polarized uniformly and trimmed in the same manner as described above to minimize the temperature-caused offset drift.

In operation, the ac excitation voltage is applied across the common electrode 209 and the driving electrode 207 to vibrate the arms 203 and 204 in opposite directions in an oscillation mode along the y-axis. During the oscillation, an output of the monitor electrode 208 is monitored to control the ac excitation voltage for maintaining the amplitude of the oscillation of the arms 203 and 204 constant. When the angular rate sensor is moved at the angular rate Ω around the z axis (i.e., the longitudinal center line of the oscillator 201), it will cause the Coriolis force to be produced which acts on the arms 203 and 204 to vibrate them in opposite directions along the x axis. This causes the arms 205 and 206 to be vibrated along the x axis. The pickup electrodes 212 and 213 produce a vibration signal having the amplitude proportional to the angular rate Ω acting on the angular rate sensor.

In order to ensure the detection accuracy of the angular rate sensors of the types as described above, it is necessary to match a frequency difference ΔF between the excited oscillation frequency fd (i.e., the resonant frequency of the oscillator when applied with the excitation signals) and the pickup oscillation frequency fs (i.e., the resonance frequency of the oscillator when it experiences the angular rate) to a preselected value. The excited oscillation frequency fd and the pickup oscillation frequency fs depend upon the size of the oscillator. For example, in an angular rate sensor of the type as described above which includes a fork oscillator having tines each being made of a square pole, the excited oscillation frequency fd is determined approximately based on the width of the tines, while the pickup oscillation frequency fs is determined approximately based on the thickness of the oscillator. The excited oscillation frequency fd is, thus, close to the pickup oscillation frequency, so that the frequency difference ΔF shows a small value (e.g., several tens Hz). The precise adjustment of the frequency difference ΔF to a preselected value requires machining the oscillator with high accuracy, but it is usually difficult because of dimensional errors caused inevitably by the machining.

The adjustment of the frequency difference ΔF capable of alleviating the above problem will be discussed below.

Figure 22:
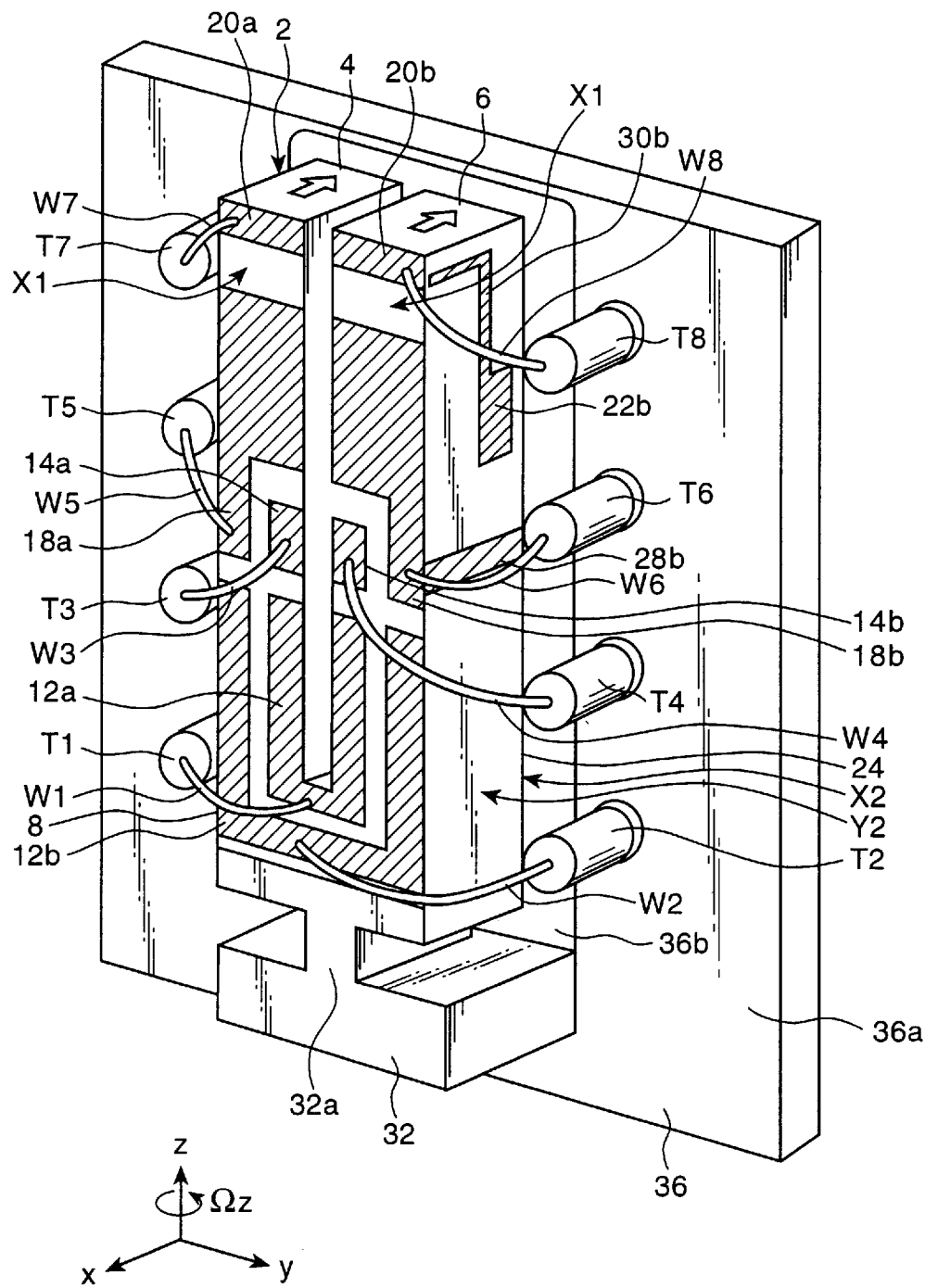
FIG. 22 is a perspective view which shows a modification of the angular rate sensor in FIG. 1 wherein a supporter for installation of an oscillator on a base is ground to adjust a frequency difference between an excited oscillation frequency and a pickup oscillation frequency.

FIG. 22 shows an angular rate sensor which is a modification of the one shown in FIG. 1. The adjustment of the frequency difference ΔF, as discussed below, refers to the shown angular rate sensor, but it may be, of course, used with all the angular rate sensors as described so far.

The oscillator 2 has formed on the surface X1 a pair of L-shaped polarizing electrodes 18a and 18b, as clearly shown in FIG. 23(a), which connect, as shown in FIGS. 23(b), 23(c), and 23(d), with the common virtual GND electrode 24 through the short-circuit electrodes 28a and 28b, respectively. The oscillator 2 also has formed on the surface X1, a pair of rectangular pad electrodes 20a and 20b which extend all over the widths of upper portions of the arms 4 and 6 and which connect with, as shown in FIGS.

23(b) and 23(c), the pickup electrodes 22a and 22b through the lead electrodes 30a and 30b, respectively.

The oscillator 2 is retained by the base 36 through the Hshaped supporter 32. The base 32 has formed in a reference surface 36a a rectangular recessed portion 36b. The supporter 32 is secured directly on the recessed portion 36b and holds the oscillator 2 so that the arms 4 and 6 may extend parallel to the base 36 with a given gap between themselves and the recessed portion 36b. The supporter 32 is made by, for example, sintering a compressed powder of the metal such as 42N and includes a narrow connecting portion 32a. The connecting portion 32a is oriented to have a longitudinal center line which extends between the arms 4 and 6 and which substantially coincides with an axis of rotation (i.e., the z axis) of a moving object on which the angular rate sensor is installed. The connecting portion 32a is, as will be described later in detail, shaped so that the frequency difference ΔF (=fs−fd) between the pickup oscillation frequency fs (e.g., 3.36 kHz) and the excited oscillation frequency fd (e.g., 3.30 kHz) may fall within a preselected range (e.g., 60 Hz ±5 Hz).

Other arrangements and operation are identical with those of the angular rate sensor in FIG. 1, and explanation thereof in detail will be omitted here.

The angular rate sensor is produced in the following steps.

First, a single piece of piezoelectric material is machined to contour a turning fork shape. Electrodes are formed on the surfaces X1 and X2 by burning a silver paste with a small amount of glass or by using printing techniques. The piezoelectric member is polarized by applying the voltage to the electrodes on the surfaces X1 and X2. Electrodes are formed on the surfaces Y1 and Y2 in the same manner as that forming the electrodes on the surfaces X1 and X1 to complete the oscillator 2. The oscillator 2 is bonded to the supporter 32. The supporter 32 is welded on the base 36. Finally, the connecting portion 32a of the supporter 32 is machined, as will be discussed later in detail, so that the frequency difference ΔF between the excited oscillation frequency fd and the pickup oscillation frequency fs may fall within a preselected range.

The excited oscillation frequency fd and the pickup oscillation frequency fs, as already described, depend upon the size of the oscillator 2. For example, the excited oscillation frequency fd is determined approximately by the width of the arms 4 and 6, while the pickup oscillation frequency fs is determined approximately by the thickness of the oscillator 2. Additionally, a ratio of a sensor sensitivity S that is an output in a unit of angular rate (1 deg/sec.) to an offset noise N that is an output of the angular rate sensor when undergoing no angular rate is also related to the size of the oscillator 2 closely. The adjustment of the frequency difference ΔF between the excited oscillation frequency fd and the pickup oscillation frequency fs to a preselected value and improvement of the S/N ratio may, thus, be accomplished by machining the oscillator 2 with high accuracy. Conversely speaking, a great shift in frequency difference ΔF from the preselected value results in a great change in S/N ratio.

In the angular rate sensor shown in FIG. 22, each of the arms 4 and 6 is made of a square rod, so that the width of each of the arms 4 and 6 is close to the thickness of the oscillator 2. The excited oscillation frequency fd is, thus, close to the pickup oscillation frequency fs so that the frequency difference ΔF (=fs−fd) shows a small value.

The adjustment of the frequency difference ΔF of the oscillator 2 to a desired value without degrading the S/N ratio requires high machining accuracy of the order of 1,2 μm. It is, thus, difficult to mass-produce such oscillators. In analysis of the adjustment of the frequency difference ΔF of the oscillator 2, the inventor found that matching the frequency difference ΔF with a desired value without degrading the S/N ratio may be achieved by machining the connecting portion 32a of the supporter 32.

Figure 24:
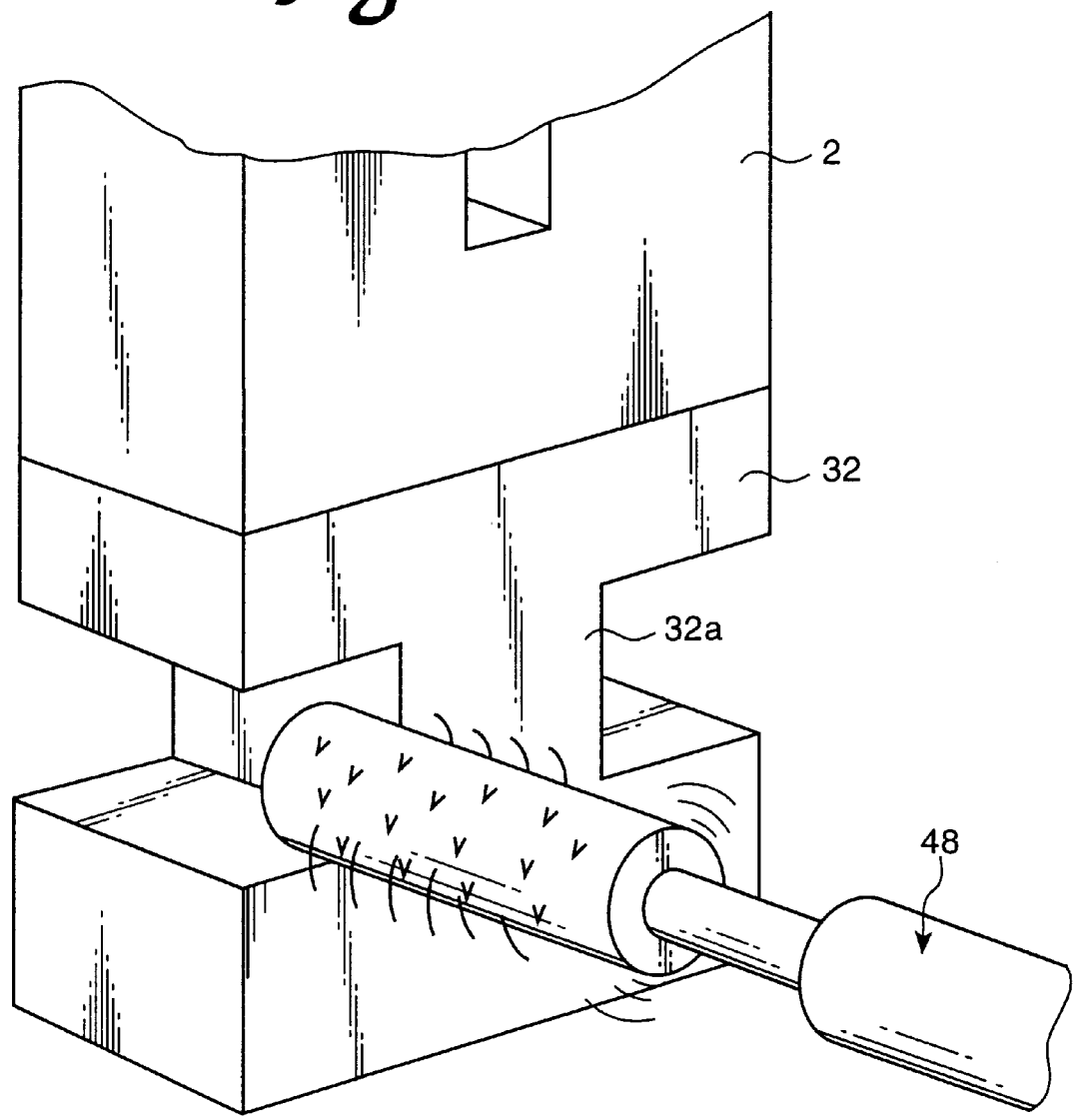
FIG. 24 is a perspective view which shows a supporter attached to an oscillator ground to adjust a frequency difference between an excited oscillation frequency and a pickup oscillation frequency.

For example, the adjustment of the frequency difference ΔF may be, as shown in FIG. 24, accomplished by removing the material from the connecting portion 32a of the supporter 32 using a grinder or router 48 to change the width, thickness, and/or length of the connecting portion 32a, thereby changing the torsional rigidity thereof to modify the excited oscillation (i.e., the excited oscillation frequency fd) and the angular rate-caused oscillation (i.e., the pickup oscillation frequency fs) of the oscillator 2 in the x- and y-axis directions.

The grinding of the connecting portion 32a is performed while monitoring the frequency difference ΔF in the following manner.

An excitation voltage (e.g., 400 mV$_{rms}$) is applied through an oscillator (not shown) to the drive electrodes 12a and 12b to monitor output signals from the pickup electrodes 22a and 22b. The frequency of the excitation voltage is swept across the excited oscillation frequency fd and the pickup oscillation frequency fs (e.g., over a range from 3.2 kHz to 3.4 kHz) to measure two peak frequencies in excitation and pickup oscillation modes. A difference between the two peak frequencies (i.e., the frequency difference ΔF) is determined. The grinding of the connecting portion 32a continues until the difference between the two peak frequencies reaches a desired value.

FIG. 25 is a graph which shows the relation between the frequency difference ΔF and the S/N ratio when the connecting portion 32a of the supporter 32 is ground and when the arms 4 and 6 are ground. The ordinate axis indicates the S/N ratio as defined as one (1) before the oscillator 2 is ground. The abscissa axis indicates a shift in frequency difference ΔF from a desired value, 60 Hz.

The graph shows that the shift in frequency difference ΔF can be adjusted so as to fall within a given range (e.g., ±5 Hz) without changing the S/N ratio essentially by grinding the supporter 32 and that grinding the arms 4 and 6 causes the S/N ratio to change greatly.

FIG. 26 illustrates variations in sensor sensitivity S measured at room temperature before and after the frequency difference ΔF is corrected. The ordinate axis indicates a difference between an actual sensor sensitivity and a desired value as expressed in percentage. FIG. 27 illustrates variations in ratio of a maximum value to a minimum value of the sensor sensitivity S when the ambient temperature is changed from −30° C. to 85° C. before and after the frequency difference ΔF is corrected. These graphs show that the sensor sensitivity S becomes stable after the frequency difference ΔF is corrected regardless of a change in ambient temperature.

The supporter 32 is, as described above, made of a sintered metal, not a molten metal and thus easy to machine. This reduces the amount of time required to adjust the frequency difference ΔF by half.

The adjustment of the torsional rigidity of the connecting portion 32a of the supporter 32 (i.e., the adjustment of the frequency difference ΔF) may also be achieved by gluing or welding a rigid member made of, for example, metal onto the connecting portion 32a or alternatively by attaching a C-shaped rigid member to the connecting portion 32a in tight engagement with side walls of the connecting portion 32a.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to he shown embodiments which can be embodied without departing from the principle of the invention as set forth in the appended claims. For example, the oscillating portion of the oscillator in each of the above described embodiments need not be made of a square rod and may alternatively be made of a polygonal rod. Each oscillator may alternatively include a metallic body and piezoelectric electrode films attached to the surface of the body. The supporters may be formed integrally with the oscillator.

What is claimed is:

1. An angular rate sensor for determining an angular rate of rotation when the angular rate sensor experiences rotation about a given axis, comprising:

an oscillator comprising a piezoelectric element including a pair of arms and a connecting portion connecting ends of the arms, said oscillator having a portion near a connection of the connecting portion and the pair of arms, said portion being trimmed for adjusting an oscillation characteristic of said oscillator;

a drive electrode formed on an outer wall of said oscillator, said drive electrode being responsive to input of an excitation signal to oscillate the arms of said oscillator in a first direction perpendicular to length of said oscillator; and a pickup electrode formed on the outer wall of said oscillator, said pickup electrode electrically picking up oscillations of the arms in a second direction different from the first direction which indicate the angular rate acting on the angular rate sensor.

2. An angular rate sensor as set forth in claim 1, wherein said trimmed portion has a length of 170% or less of a width of the connecting portion extending in a lengthwise direction along one of the arms.

3. An angular rate sensor as set forth in claim 1, wherein said trimmed portion having a length of 70% or less of a width of the connecting portion in a lengthwise direction of the arms.

4. An angular rate sensor as set forth in claim 1, wherein said trimmed portion has a length along at least one of the arms and the connecting portion, said length being 170% or less of a width of the connecting portion in a lengthwise direction of the one of the arms and 70% or less of the width of the connecting portion.

5. A method of adjusting an oscillation characteristic of an oscillator of an angular rate sensor, the oscillator being comprising a piezoelectric element shaped to have a plurality of longitudinal edges, including at least one pair of arms and a connecting portion connecting ends of the arms, the oscillator having disposed thereon an excitation electrode and a pickup electrode, the arms being excited by input of an excitation signal through the excitation electrode to oscillate in a first direction perpendicular to length of the arms and, when the angular rate sensor undergoes an angular rate during excitation of the arms, oscillating in a second direction different from the first direction to provide an output signal indicative of the angular rate through the pickup electrode, comprising the steps of:

applying an ac voltage to the excitation electrode to oscillate the arms in the first direction;

monitoring an output signal of the oscillator through the pickup electrode during oscillation of the arms by application of the ac voltage; and trimming a portion of said oscillator near a connection of the connecting portion and the arms so as to decrease an amplitude of the monitored output signal of the oscillator to minimize undesired oscillations of the oscillator in the second direction when excited by the input of the excitation signal.

6. A method as set forth in claim 5, wherein the trimmed portion of said oscillator has a length of 170% or less of a width of the connecting portion extending in a lengthwise direction along one of the arms.

7. A method as set forth in claim 5, wherein the trimmed portion of said oscillator has a length of 70% or less of a width of the connecting portion in a lengthwise direction of the arms.

8. A method as set forth in claim 5, wherein the trimmed portion of said oscillator has a length along at least one of the arms and the connecting portion, said length being 170% or less of a width of the connecting portion in a lengthwise direction of the one of the arms and 70% or less of the width of the connecting portion.

9. A method as set forth in claim 5, wherein said trimming step removes material from said oscillator forming the trimmed portion.

10. A method as set forth in claim 8, wherein said trimming step removes material from at least one of the longitudinal edges of said oscillator forming the trimmed portion.

11. A method as set forth in claim 9, wherein said trimming step comprises machining said oscillator in the lengthwise direction of the arms forming the trimmed portion.

12. A method as set forth in claim 9, wherein said trimmed portion forming step comprises machining said oscillator in a depthwise direction of the oscillator to form the trimmed portion.

13. The angular rate sensor as set forth in claim 1, wherein said oscillator is a prism member.

14. The angular rate sensor as set forth in claim 13, where the trimmed portion is formed on a ridge of the prism member.

15. The method as set forth in claim 5, wherein said oscillator is formed by a prism member having the longitudinal edges.

16. The method as set forth in claim 15, wherein the trimmed portion is formed on at least one of the longitudinal edges of said oscillator.

* * * * *